(12) United States Patent
Lee et al.

(10) Patent No.: US 11,874,523 B2
(45) Date of Patent: *Jan. 16, 2024

(54) LENS MOVING APPARATUS

(71) Applicant: LG INNOTEK CO., LTD., Seoul (KR)

(72) Inventors: Seong Min Lee, Seoul (KR); Sang Ok Park, Seoul (KR); Hyune O Yoo, Seoul (KR); Byung Wook Son, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,065

(22) Filed: Mar. 3, 2022

(65) Prior Publication Data
US 2022/0187564 A1 Jun. 16, 2022

Related U.S. Application Data

(63) Continuation of application No. 16/795,989, filed on Feb. 20, 2020, now Pat. No. 11,294,142, which is a
(Continued)

(30) Foreign Application Priority Data

Dec. 23, 2013 (KR) .................. 10-2013-0160980
May 9, 2014 (KR) .................. 10-2014-0055364

(51) Int. Cl.
*G02B 7/02* (2021.01)
*G02B 15/14* (2006.01)
(Continued)

(52) U.S. Cl.
CPC ............. *G02B 7/09* (2013.01); *G03B 3/10* (2013.01); *H02K 11/215* (2016.01); *H02K 41/0356* (2013.01)

(58) Field of Classification Search
CPC ........ G02B 7/102; G02B 15/173; G02B 7/10; G02B 7/021; G02B 7/04; G02B 7/08; G03B 3/10; G03B 17/14; G11B 7/0932
(Continued)

(56) References Cited

U.S. PATENT DOCUMENTS 4,727,529 A * 2/1988 Araki .................. G11B 7/0956
5,220,461 A * 6/1993 Inoue ....................... G02B 7/10
359/823
(Continued)

FOREIGN PATENT DOCUMENTS

CN 1959453 A 5/2007
CN 101055342 A 10/2007
(Continued)

OTHER PUBLICATIONS

Korean Office Action for Korean Application No. 10-2020-0126128, dated Mar. 8, 2021.

*Primary Examiner* — Dawayne Pinkney
(74) *Attorney, Agent, or Firm* — Birch, Stewart, Kolasch & Birch, LLP

(57) ABSTRACT

A lens moving apparatus can include a housing; a base disposed below the housing; a bobbin disposed inside the housing and configured to move in a first direction along or parallel with an optical axis within the housing; driving magnets disposed on the housing; a coil provided at an outer surface of the bobbin; an elastic member coupled to the bobbin and supporting the bobbin; a sensing magnet coupled to the bobbin; and a position sensor coupled to a printed circuit board, wherein the position sensor is configured to sense a displacement of the sensing magnet in the first direction, in which the bobbin includes a reception recess formed on the outer surface of the bobbin such that at least a part of the reception recess is located at an inside of the coil, the sensing magnet is disposed in the reception recess,
(Continued)

and the position sensor is disposed on another side of the housing than sides on which the driving magnets are disposed.

20 Claims, 18 Drawing Sheets

Related U.S. Application Data continuation of application No. 15/937,330, filed on Mar. 27, 2018, now Pat. No. 10,606,025, which is a continuation of application No. 15/630,637, filed on Jun. 22, 2017, now Pat. No. 9,958,634, which is a continuation of application No. 14/578,711, filed on Dec. 22, 2014, now Pat. No. 9,690,070.

(51) Int. Cl.
*G02B 3/10* (2006.01)
*G02B 7/09* (2021.01)
*H02K 41/035* (2006.01)
*H02K 11/215* (2016.01)
*G03B 3/10* (2021.01)

(58) Field of Classification Search
USPC ........ 359/811–830, 694, 696, 676, 699–701; 396/133, 137
See application file for complete search history.

(56) References Cited

U.S. PATENT DOCUMENTS

| | | |
|---|---|---|
| 2005/0174009 A1 | 8/2005 | Kayama et al. |
| 2006/0267421 A1 | 11/2006 | Aoshima |
| 2007/0047942 A1 | 3/2007 | Chang et al. |
| 2007/0097530 A1 | 5/2007 | Kuo et al. |
| 2007/0177279 A1 | 8/2007 | Cho et al. |
| 2007/0242152 A1 | 10/2007 | Chen |
| 2009/0278978 A1 | 11/2009 | Suzuki |
| 2010/0270870 A1 | 10/2010 | Liao |
| 2011/0122495 A1 | 5/2011 | Togashi |
| 2011/0170204 A1 | 7/2011 | Park et al. |
| 2012/0008220 A1 | 1/2012 | Lee et al. |
| 2012/0026611 A1 | 2/2012 | Hu et al. |
| 2012/0200176 A1 | 8/2012 | Park |
| 2012/0314307 A1 | 12/2012 | Ikushima et al. |
| 2013/0088607 A1 | 4/2013 | Akutsu et al. |
| 2013/0163085 A1 | 6/2013 | Lim et al. |
| 2013/0293179 A1 | 11/2013 | Lee |
| 2014/0072289 A1 | 3/2014 | Lim et al. |
| 2014/0104486 A1 | 4/2014 | Seol et al. |
| 2015/0309282 A1* | 10/2015 | Lee .................. G02B 7/09 359/814 |
| 2015/0319345 A1* | 11/2015 | Park .................. G02B 7/09 359/557 |

FOREIGN PATENT DOCUMENTS

| | | |
|---|---|---|
| CN | 101860165 A | 10/2010 |
| CN | 102062926 A | 5/2011 |
| CN | 102315748 A | 1/2012 |
| CN | 102385131 A | 3/2012 |
| CN | 102629815 A | 8/2012 |
| EP | 0469532 A2 | 2/1992 |
| EP | 0618664 A2 | 10/1994 |
| JP | 11-289743 A | 10/1999 |
| JP | 2006-235583 A | 9/2006 |
| JP | 2007-121850 A | 5/2007 |
| JP | 2008-58391 A | 3/2008 |
| JP | 2008-185913 A | 8/2008 |
| JP | 2012-27433 A | 2/2012 |
| JP | 2012-177753 A | 9/2012 |
| JP | 2013-24944 A | 2/2013 |
| JP | 2013-33179 A | 2/2013 |
| JP | 2013-127492 A | 6/2013 |
| KR | 10-2011-0106664 A | 9/2011 |
| KR | 10-2012-0012086 A | 2/2012 |
| KR | 10-2012-0053840 A | 5/2012 |
| KR | 10-2012-0090379 A | 8/2012 |
| KR | 10-2013-0060535 A | 6/2013 |
| KR | 10-2013-0088052 A | 8/2013 |
| KR | 10-1343197 B1 | 12/2013 |
| TW | 200708873 A | 3/2007 |
| TW | 201205143 A1 | 2/2012 |
| WO | WO2011/105470 A1 | 9/2011 |
| WO | WO 2013/094963 A1 | 6/2013 |

* cited by examiner

[FIG. 3]
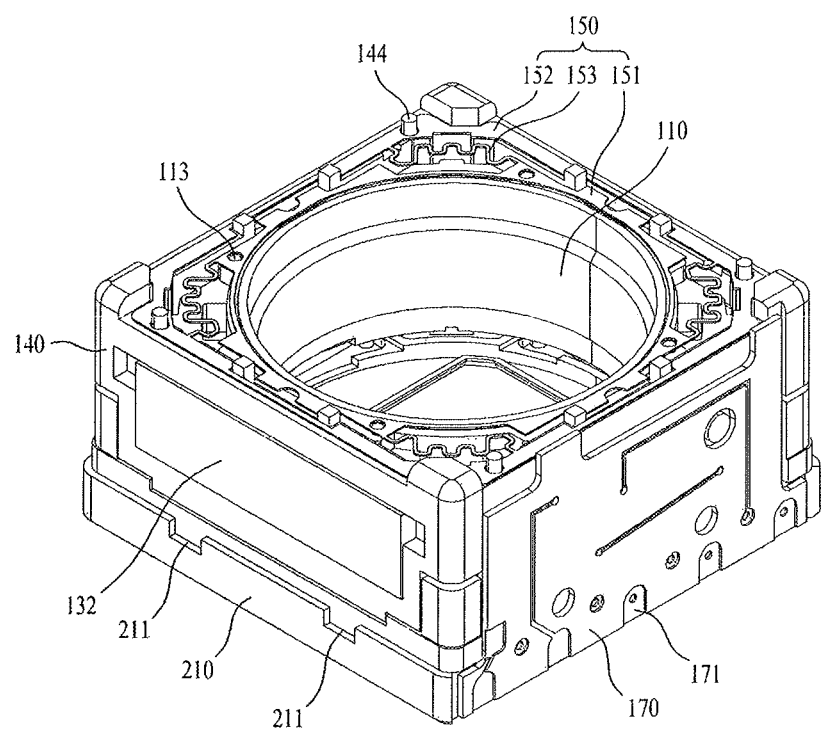

[FIG. 4]
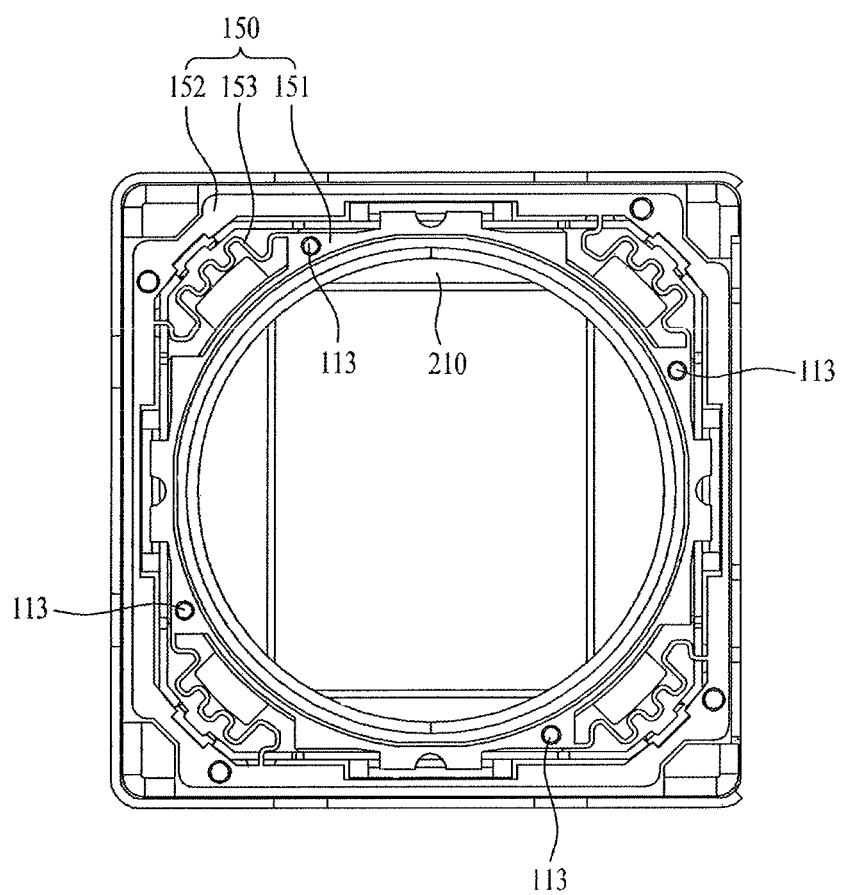

【FIG. 5】
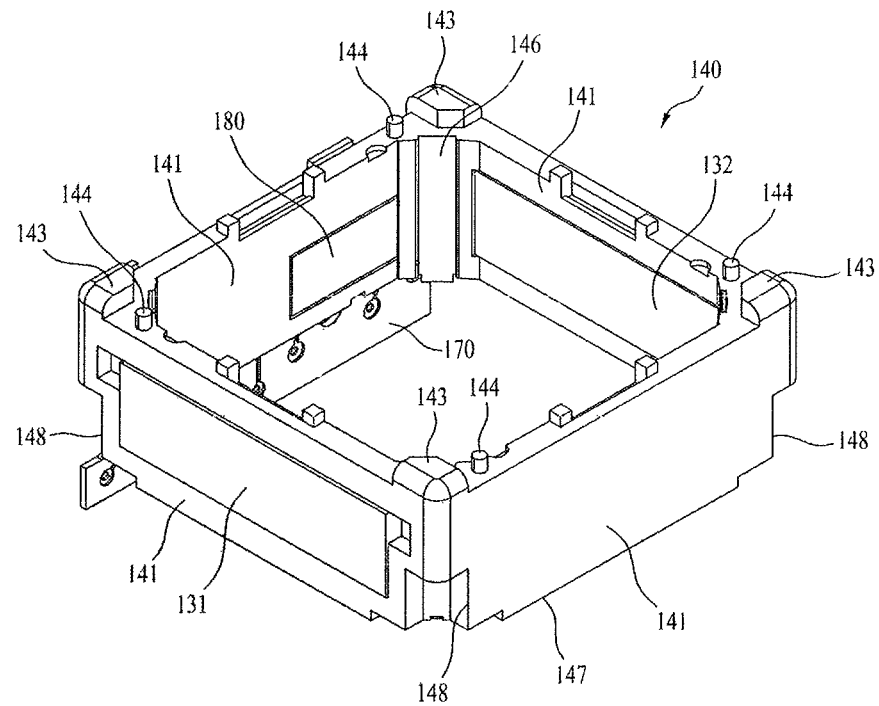
【FIG. 6】
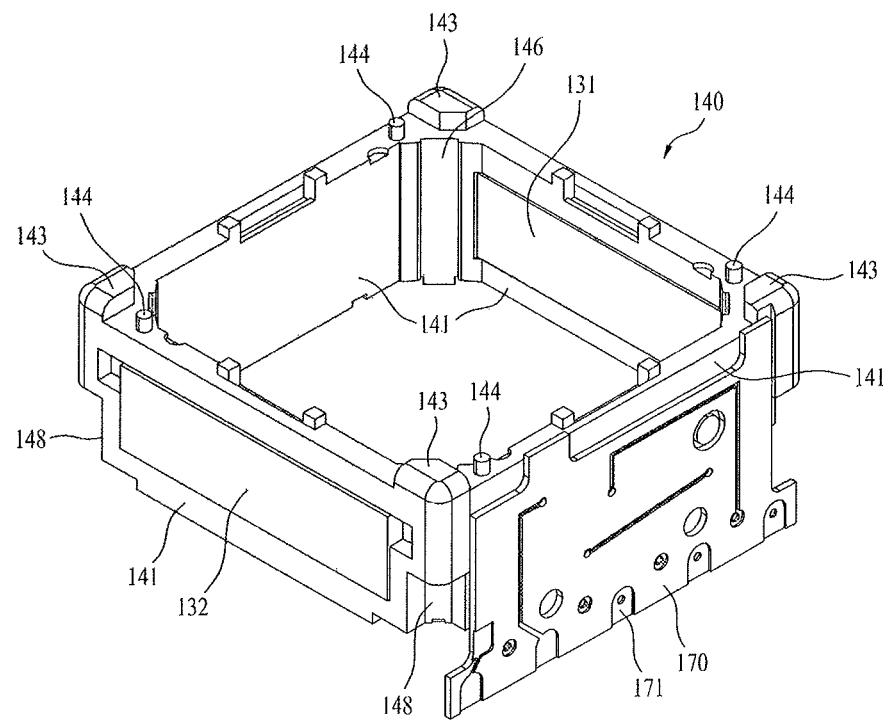

【FIG. 7】
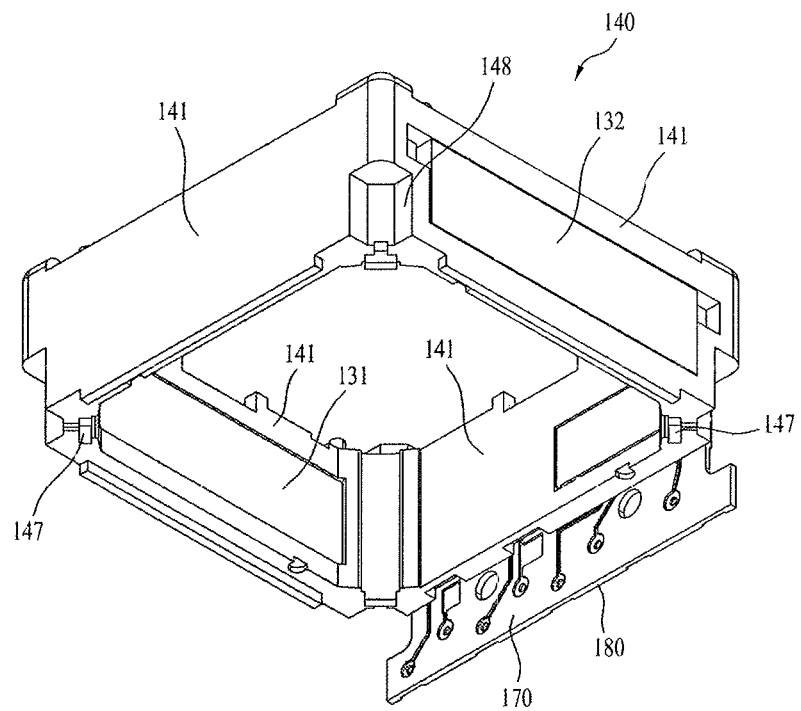

[FIG. 8]
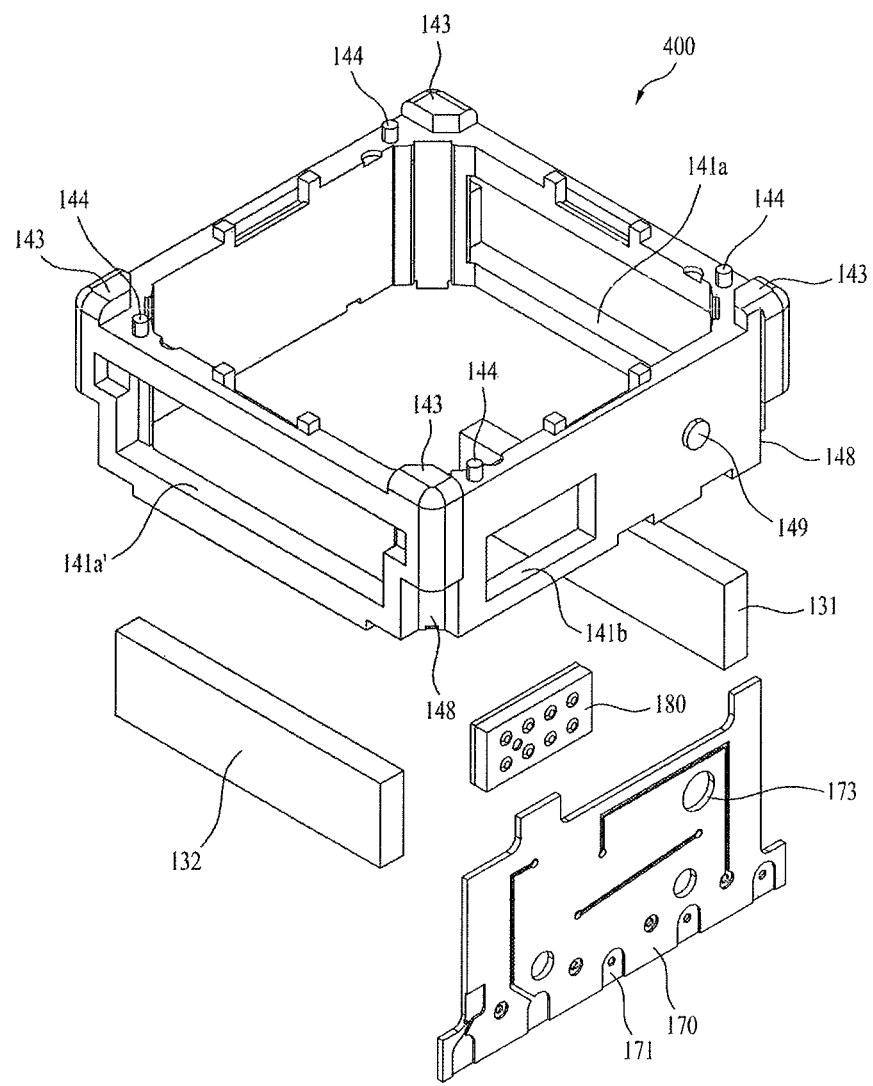

[FIG. 9]
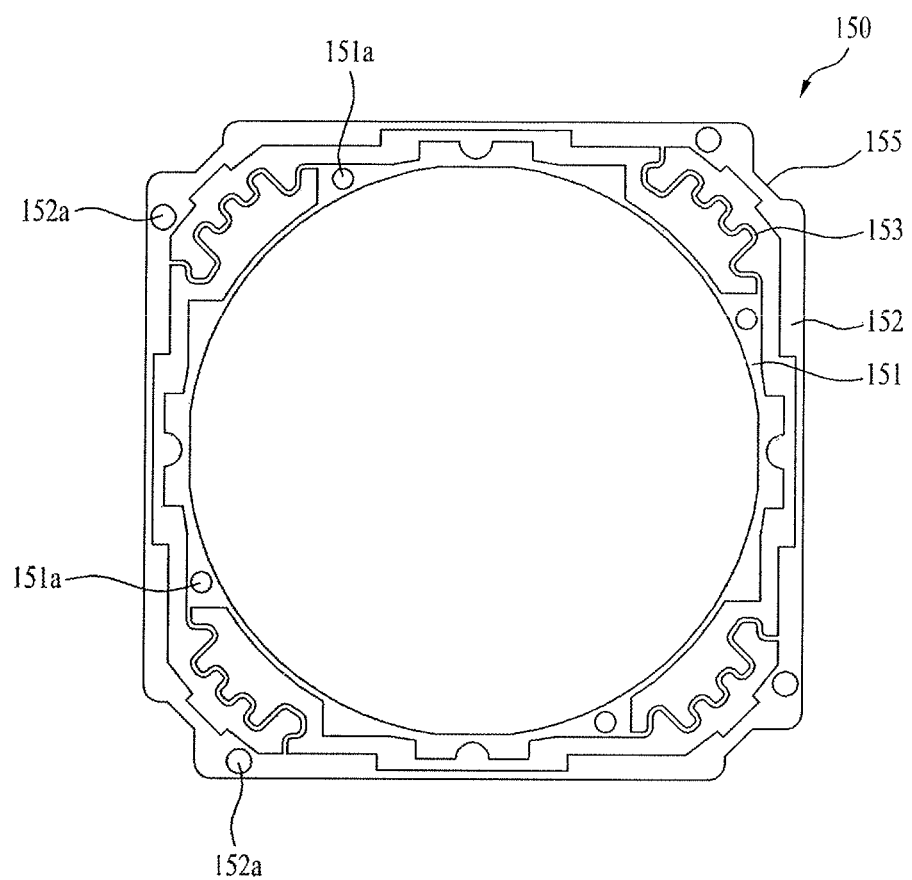

[FIG. 10]
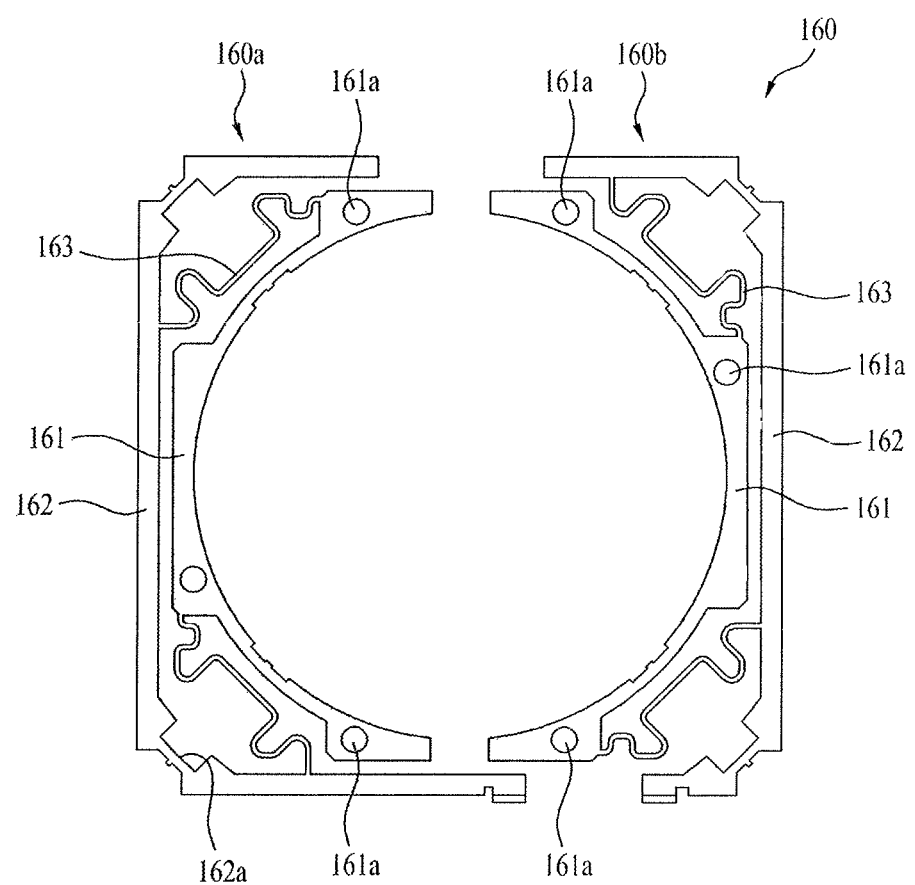

[FIG. 11]
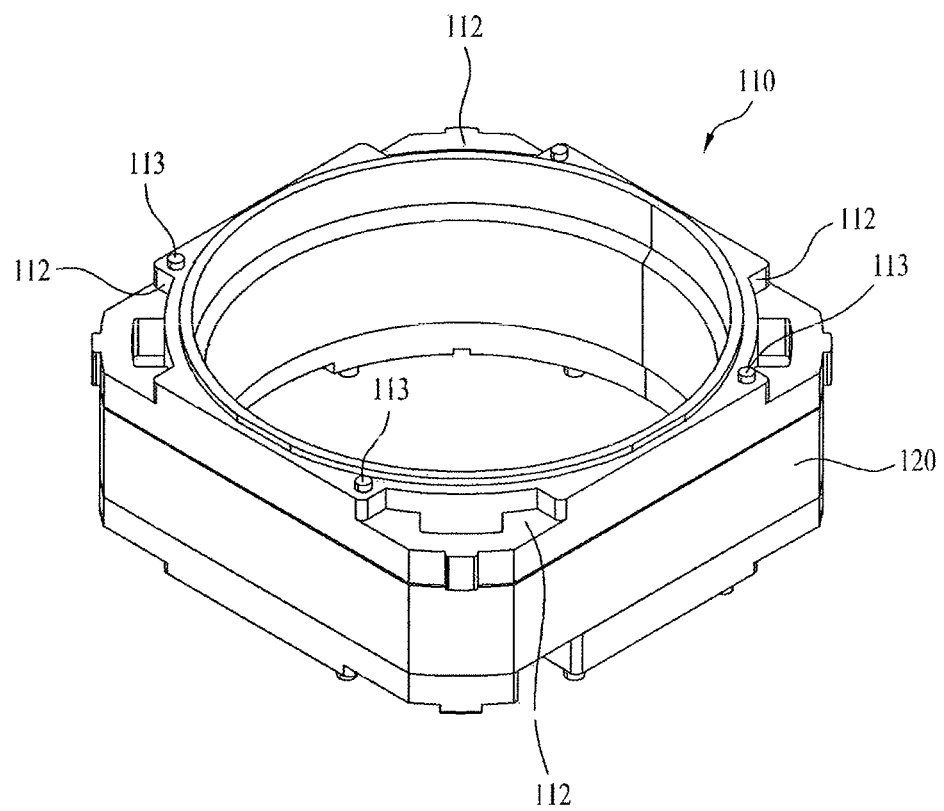

【FIG. 12】
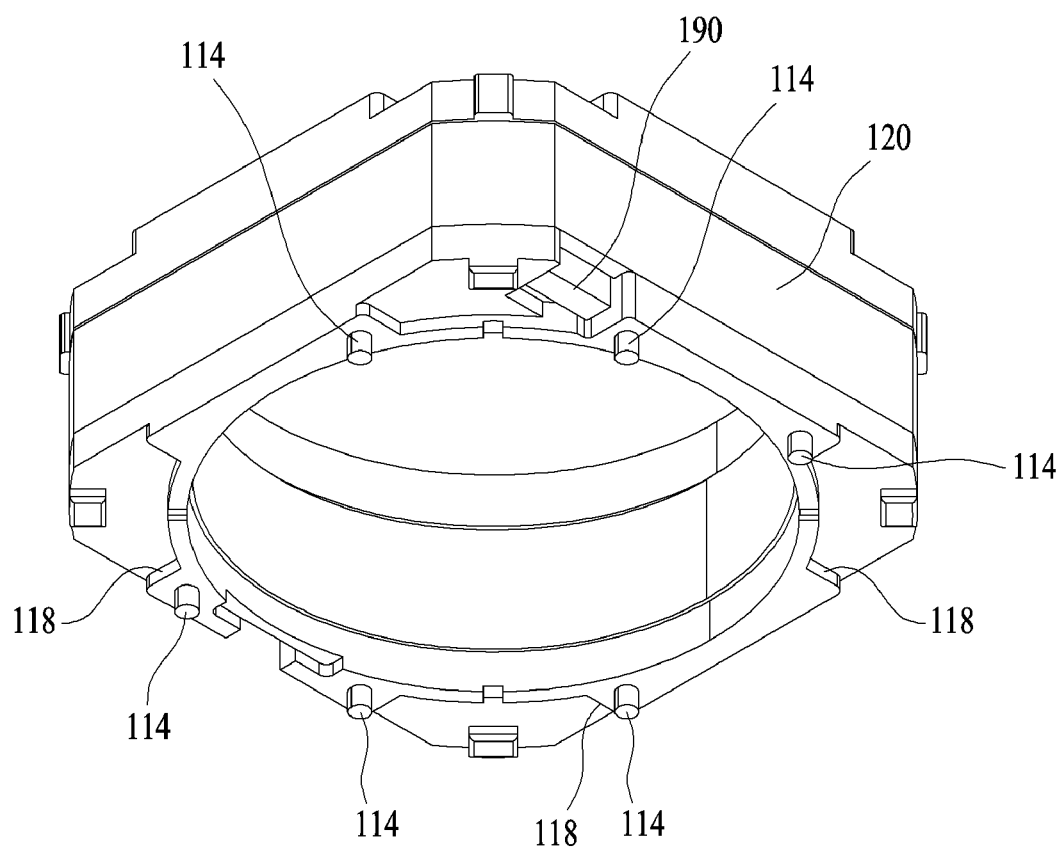

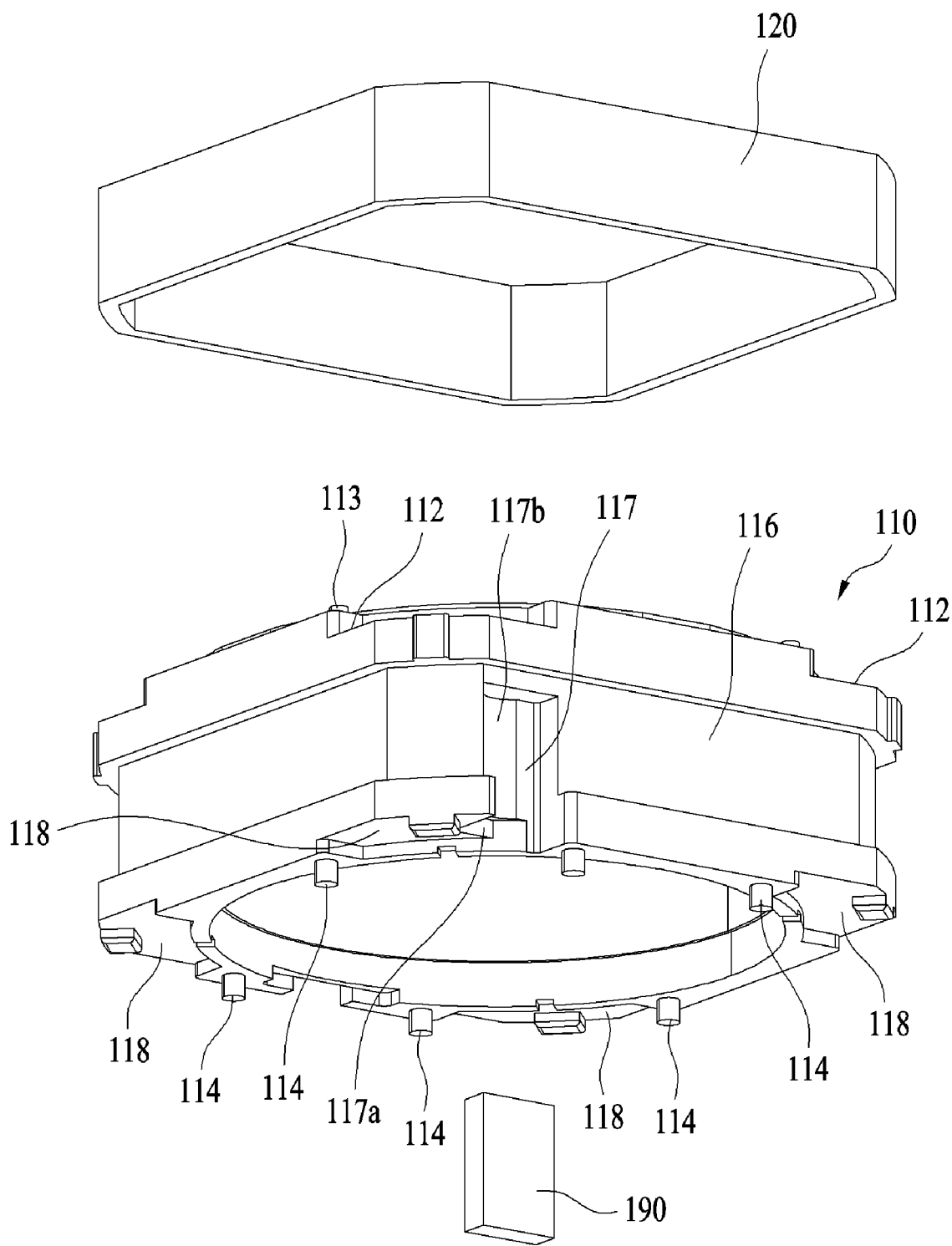
【FIG. 13】

【FIG. 14】
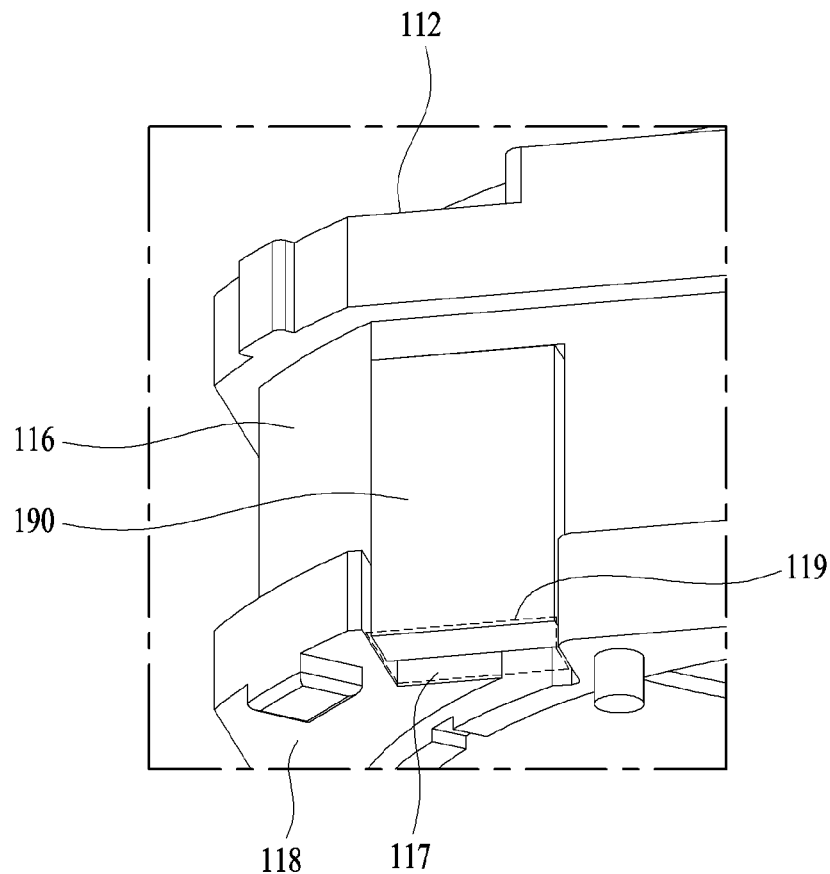
【FIG. 15】
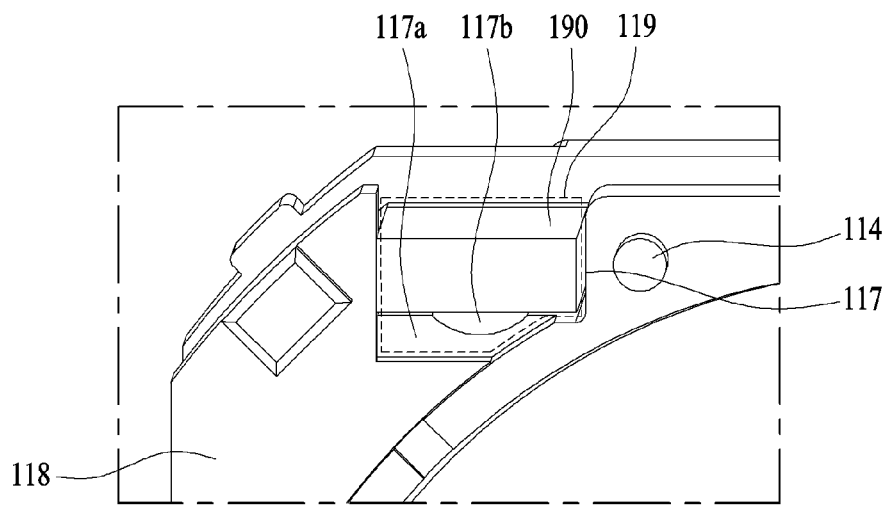

[FIG. 16]
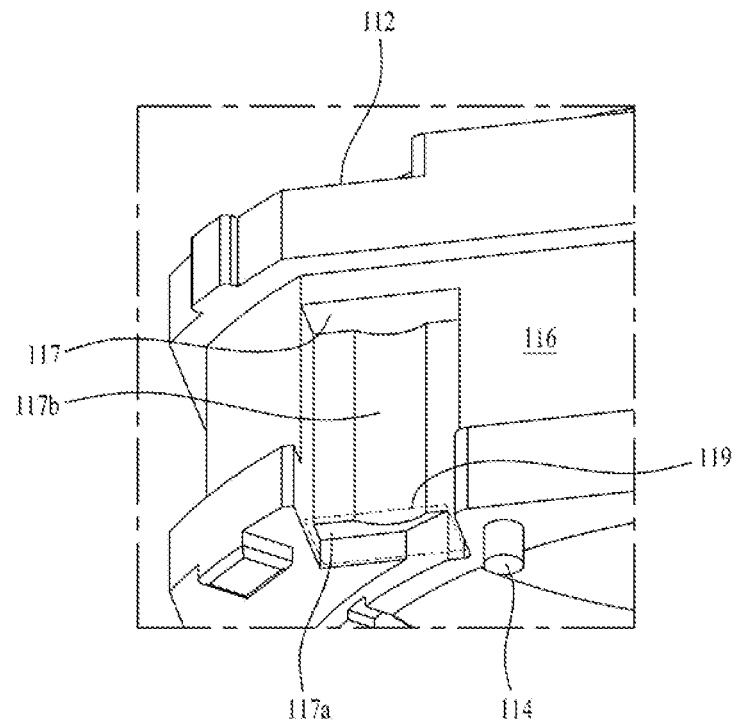
[FIG. 17]
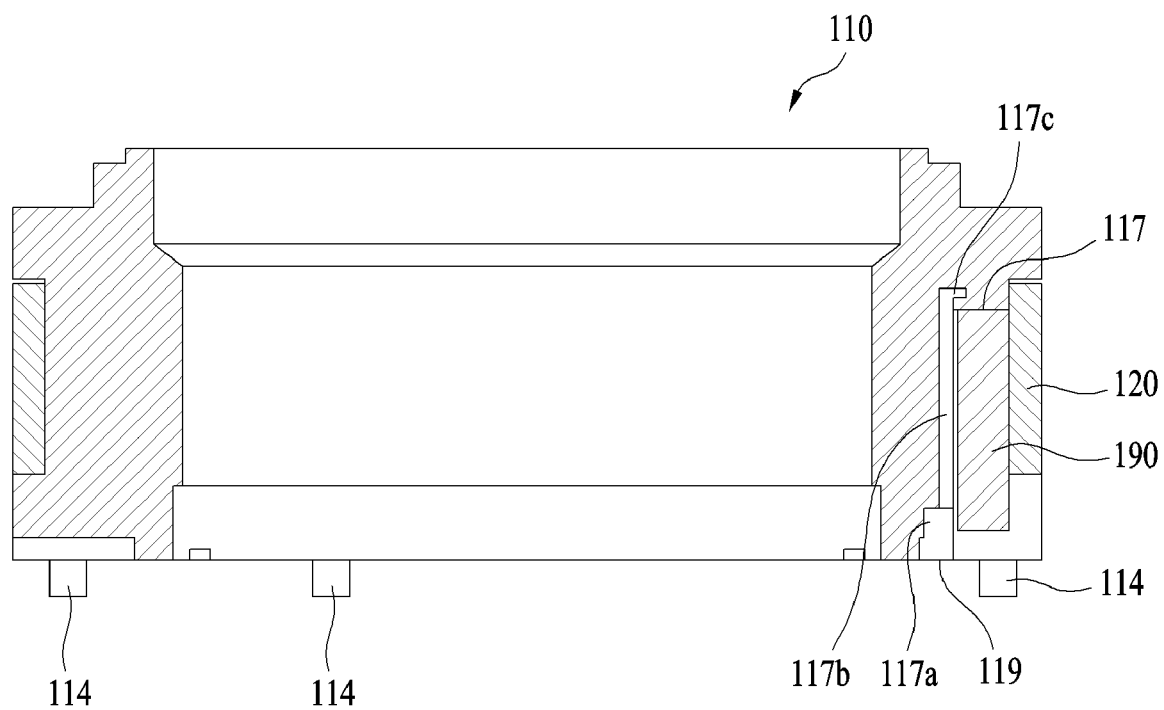

【FIG. 18】
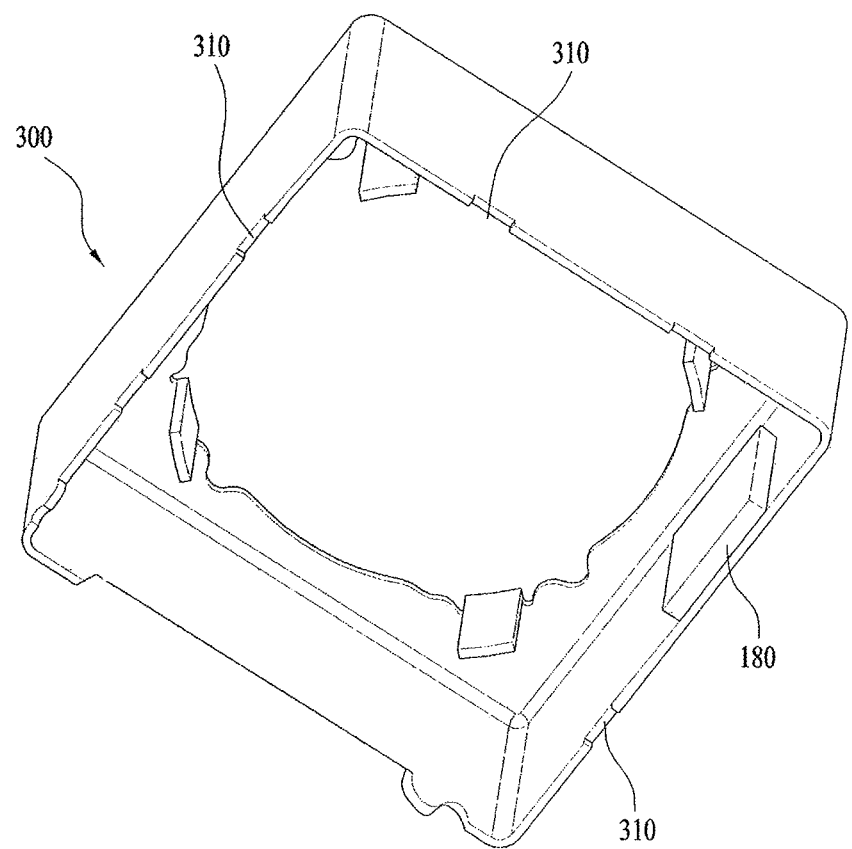
【FIG. 19】
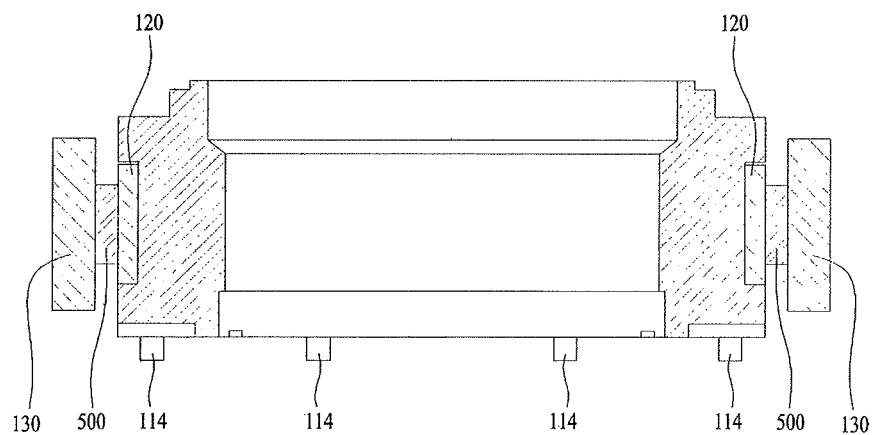

[FIG. 20]
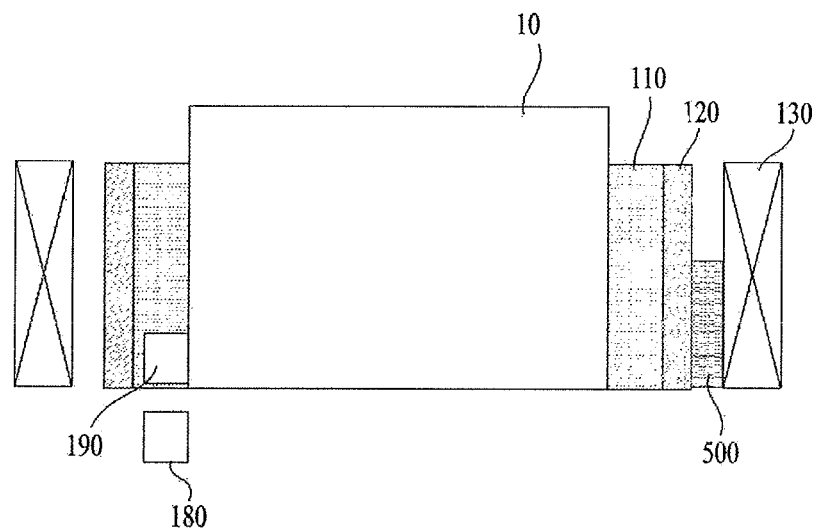
[FIG. 21]
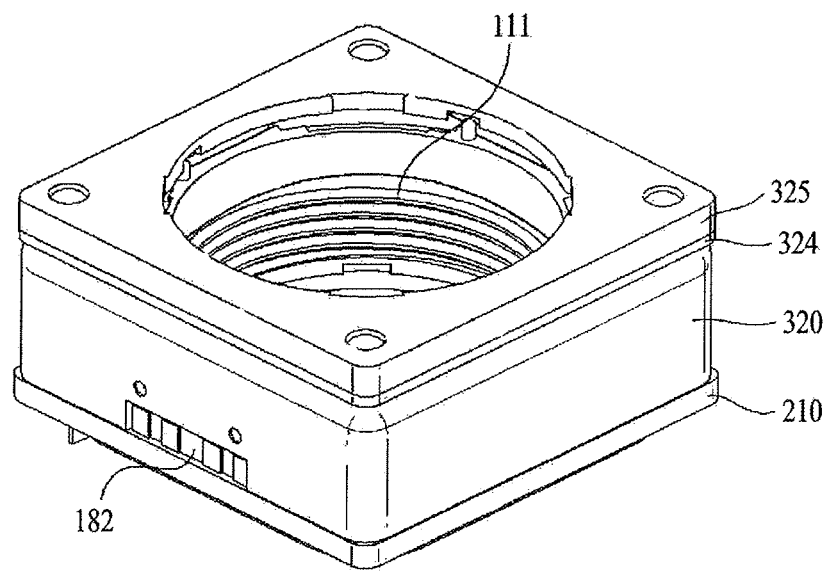

[FIG. 22]
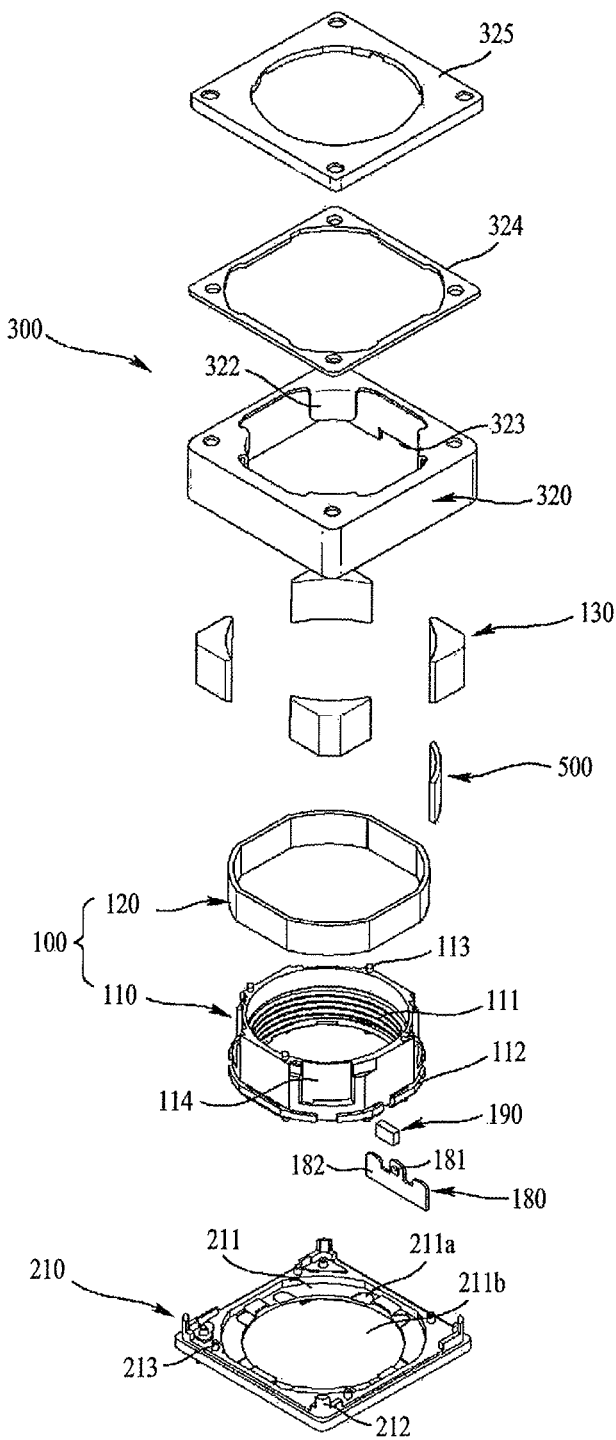

[FIG. 23]
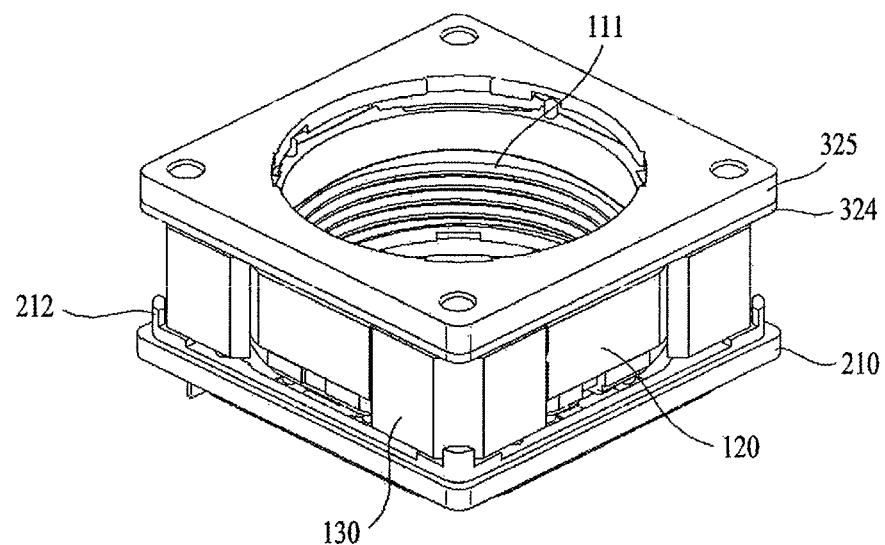
[FIG. 24]
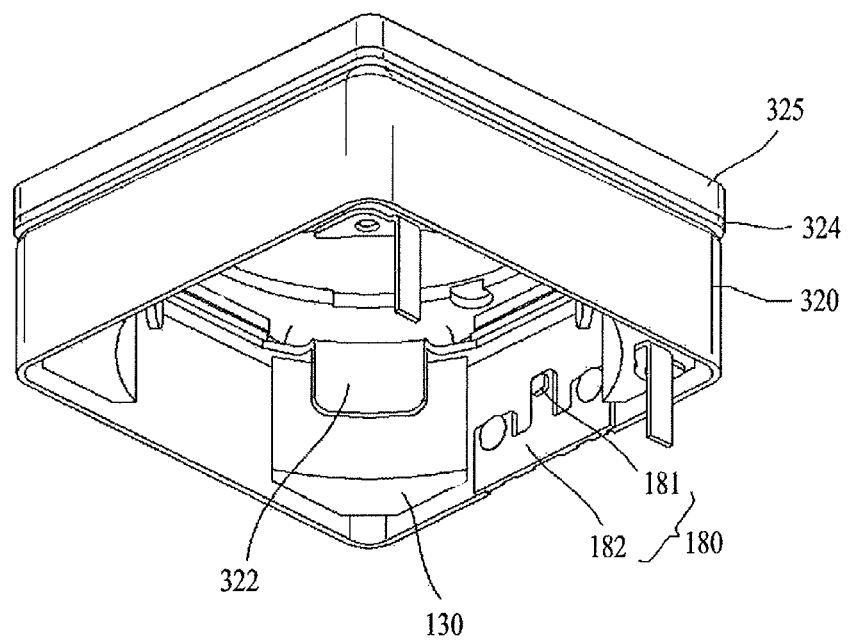

LENS MOVING APPARATUS

CROSS REFERENCE TO RELATED APPLICATION

This application is a Continuation of U.S. patent application Ser. No. 16/795,989 filed on Feb. 20, 2020, which is a Continuation of U.S. patent application Ser. No. 15/937,330 filed on Mar. 27, 2018, (now U.S. Pat. No. 10,606,025 issued on Mar. 31, 2020), which is a Continuation of U.S. patent application Ser. No. 15/630,637 filed on Jun. 22, 2017 (now U.S. Pat. No. 9,958,634 issued on May 1, 2018), which is a Continuation of U.S. patent application Ser. No. 14/578,711 filed on Dec. 22, 2014 (now U.S. Pat. No. 9,690,070 issued on Jun. 27, 2017), which claims priority under 35 U.S.C. § 119 to Korean Application No. 10-2013-0160980, filed in the Republic of Korea on Dec. 23, 2013, and No. 10-2014-0055364, filed in the Republic of Korea on May 9, 2014, all of which are here by expressly incorporated by reference into the present application.

BACKROUND OF THE INVENTION

Embodiments relate to a lens moving apparatus, and more particularly, to a lens moving apparatus which improves space efficiency of a bobbin and performs feedback of the displacement of a lens in the optical axis direction to shorten a focus alignment time of the lens.

Recently, development of IT products, such as cellular phones, smartphones, tablet PCs, notebooks, etc., having micro digital cameras installed therein, is underway.

In an IT product having a conventional micro digital camera installed therein, a lens moving apparatus aligning the focal distance of a lens by adjusting an interval between an image sensor converting external light into a digital image or a digital moving picture and the lens is provided.

However, in order to perform an auto-focusing function, the conventional micro digital camera requires a long auto-focusing time.

SUMMARY OF THE INVENTION

Embodiments provide a lens moving apparatus which may shorten an auto-focusing time of a lens.

Embodiments provide a lens moving apparatus which may more accurately and rapidly locate a lens at a focal distance of the lens.

Embodiments provide a lens moving apparatus which may improve an auto-focusing function and have enhanced space efficiency and durability.

In one embodiment, a lens moving apparatus includes a housing supporting driving magnets, a bobbin including a coil disposed on the outer surface thereof inside the driving magnets, and moving in a first direction parallel with an optical axis within the housing by electromagnetic interaction between the driving magnets and the coil, and a sensing unit sensing a movement of the bobbin in the first direction.

In another embodiment, a lens moving apparatus includes a housing supporting driving magnets, a bobbin including a coil disposed on the outer surface thereof inside the driving magnets, and moving in a first direction parallel with an optical axis within the housing by electromagnetic interaction between the driving magnets and the coil, and magnetic bodies provided between the driving magnets and the coil so as to be mounted on the driving magnets and to surface-contact the coil.

In yet another embodiment, a lens moving apparatus includes a housing supporting driving magnets, a bobbin including a coil disposed on the outer surface thereof inside the driving magnets, and moving in a first direction parallel with an optical axis within the housing by electromagnetic interaction between the driving magnets and the coil, magnetic bodies provided between the driving magnets and the coil so as to be mounted on the driving magnets and to surface-contact the coil, and a sensing unit sensing a movement of the bobbin in the first direction.

BRIEF DESCRIPTION OF THE DRAWINGS

Arrangements and embodiments may be described in detail with reference to the following drawings in which like reference numerals refer to like elements and wherein:

FIG. 3 is a schematic perspective view of the lens moving apparatus of FIG. 1, from which a cover member is removed;

FIG. 4 is a schematic plan view of FIG. 3;

FIG. 5 is a schematic perspective view of a housing in accordance with the embodiment;

FIG. 6 is a schematic perspective view of the housing, as seen from an angle differing from the angle of FIG. 5;

FIG. 7 is a schematic perspective bottom view of the housing in accordance with the embodiment;

FIG. 8 is a schematic exploded perspective view of the housing in accordance with the embodiment;

FIG. 9 is a schematic plan view of an upper elastic member in accordance with the embodiment;

FIG. 10 is a schematic plan view of a lower elastic member in accordance with the embodiment;

FIG. 11 is a schematic perspective view of a bobbin in accordance with the embodiment;

FIG. 12 is a schematic perspective bottom view of the bobbin in accordance with the embodiment;

FIG. 13 is a schematic exploded perspective view of the bobbin in accordance with the embodiment;

FIG. 14 is a partially enlarged perspective view of FIG. 13;

FIG. 15 is a partially enlarged bottom view of FIG. 13;

FIG. 16 is a partially enlarged perspective view of a reception recess in accordance with the embodiment;

FIG. 17 is a schematic longitudinal-sectional view of the bobbin in accordance with the embodiment;

FIG. 18 is a view illustrating a position sensor in a mounted state in accordance with another embodiment;

FIG. 19 is a view illustrating magnetic bodies in a mounted state in accordance with one embodiment;

FIG. 20 is a schematic side view of a lens moving apparatus in accordance with another embodiment;

FIG. 21 is a perspective view of the lens moving apparatus in accordance with the embodiment;

FIG. 22 is a perspective view of the lens moving apparatus of FIG. 20, from which a yoke unit is removed;

FIG. 23 is an exploded perspective view of the lens moving apparatus in accordance with the embodiment; and FIG. 24 is a view illustrating a cover member in accordance with the embodiment, as seen from the bottom.

DETAILED DESCRIPTION OF THE INVENTION

Figure 1:
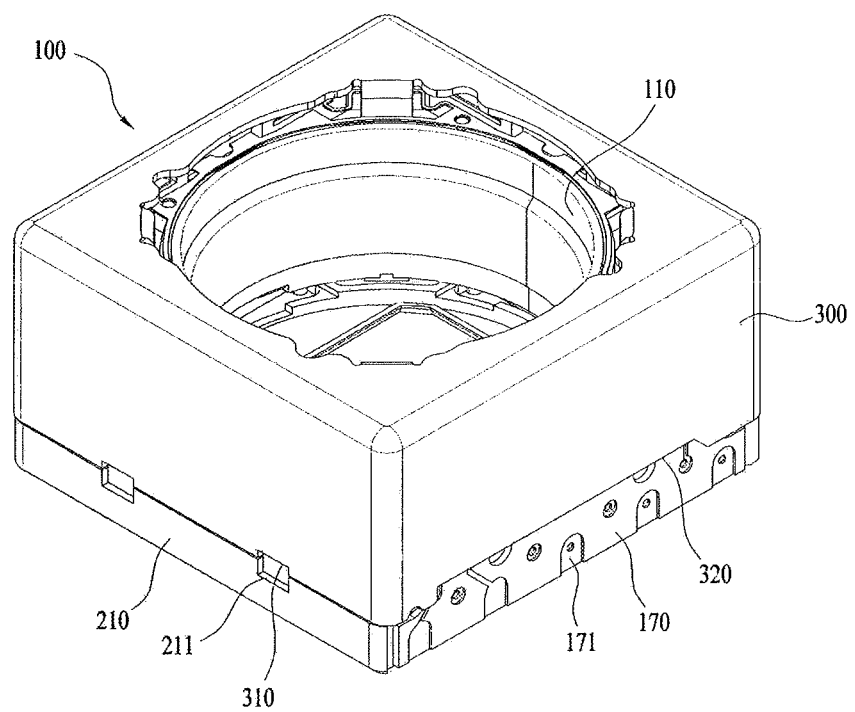
FIG. 1 is a schematic perspective view of a lens moving apparatus in accordance with one embodiment.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Embodiment 1

Figure 2:
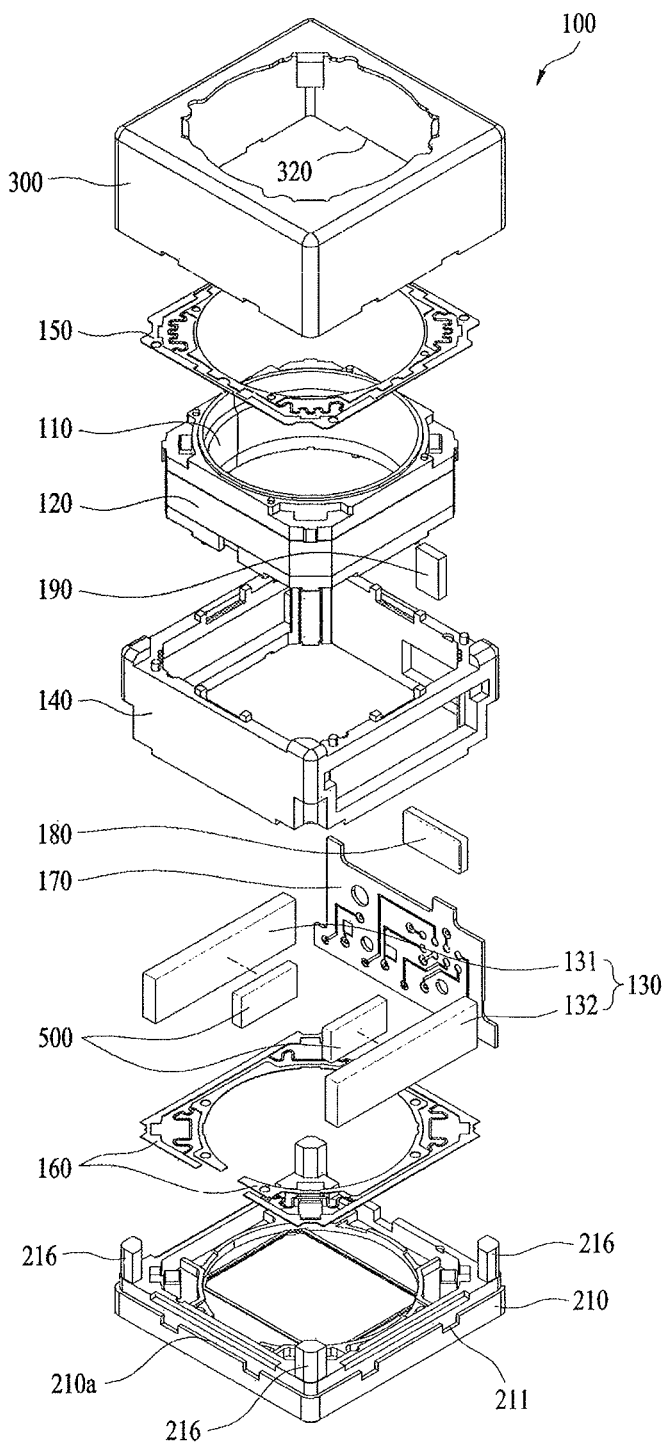
FIG. 2 is a schematic exploded perspective view of the lens moving apparatus in accordance with the embodiment.

FIG. 1 is a schematic perspective view of a lens moving apparatus 100 in accordance with one embodiment, FIG. 2 is a schematic exploded perspective view of the lens moving apparatus 100 in accordance with the embodiment, FIG. 3 is a schematic perspective view of the lens moving apparatus 100 of FIG. 1, from which a cover member 300 is removed, FIG. 4 is a schematic plan view of FIG. 3, FIG. 5 is a schematic perspective view of a housing 140 in accordance with the embodiment, FIG. 6 is a schematic perspective view of the housing 140, as seen from an angle differing from the angle of FIG. 5, FIG. 7 is a schematic perspective bottom view of the housing 140 in accordance with the embodiment, FIG. 8 is a schematic exploded perspective view of the housing 140 in accordance with the embodiment, FIG. 9 is a schematic plan view of an upper elastic member 150 in accordance with the embodiment, and FIG. 10 is a schematic plan view of a lower elastic member 160 in accordance with the embodiment.

The lens moving apparatus 100 in accordance with this embodiment is an apparatus which locates an image sensor at the focal distance of a lens by adjusting a distance between the lens and the image sensor in a camera module. That is, the lens moving apparatus 100 is an apparatus performing an auto-focusing function.

As exemplarily shown in FIGS. 1 to 4, the lens moving apparatus 100 in accordance with this embodiment may include a cover member 300, an upper elastic member 150, a bobbin 110, a coil 120 provided on the bobbin 110, a housing 140, driving magnets 130 and a printed circuit board 170 provided on the housing 140, a lower elastic member 160, a base 210, a sensing unit sensing a movement of the bobbin 110 in the optical axis direction (i.e., the first direction), and magnetic bodies 500 mounted on the driving magnets 130.

The cover member 300 may have a box shape and be combined with the upper portion of the base 210. In a reception space formed by the cover member 300 and the base 210, the upper elastic member 150, the bobbin 110, the coil 120 provided on the bobbin 110, the housing 140, and the driving magnets 130 and the printed circuit board 170 provided on the housing 140 may be received.

The cover member 300 may be provided with an opening formed on the upper surface thereof to expose a lens combined with the bobbin 110 to external light. Further, a window formed of a light transmitting material may be provided on the opening. The window may prevent foreign substances, such as dust or moisture, from being introduced into a camera module.

The cover member 300 may include first grooves 310 formed at the lower portion thereof. Although this will be described later, the base 210 may include second grooves 211 at regions contacting the first grooves 310 (i.e., a positions corresponding to the first grooves 310) when the cover member 300 and the base 210 are combined. When the cover member 300 and the base 210 are combined, recesses having a designated area may be formed through combination of the first grooves 310 and the second grooves 211. An adhesive member having viscosity may be applied to the recesses. That is, the adhesive member applied to the recesses fills gaps between opposite surfaces of the cover member 300 and the base 210 through the recesses and may seal a space between the cover member 300 and the base 210 and close the side surfaces of the cover member 300 and the base 210 when the cover 300 and the base 210 are combined.

Further, a third groove 320 may be formed on a surface of the cover member 300 corresponding to a terminal surface of the printed circuit board 170 so as to prevent interference between the cover member 300 and a plurality of terminals formed on the terminal surface. The third groove 320 may be formed on the entirety of the surface of the cover member 300 opposite the terminal surface, and the adhesive member may be applied to the inside of the third groove 320 to seal the cover member 300, the base 210, and the printed circuit board 170 and to close the side surfaces of the cover member 300 and the base 210 when the cover 300 and the base 210 are combined.

Although the first grooves 310, the second grooves 211, and the third groove 310 are formed on the cover member 300 and the base 210, the disclosure is not limited thereto but the first grooves 310, the second grooves 211, and the third groove 310 having similar shapes to the above shapes may be formed on the base 210 only or formed on the cover member 300 only.

The base 210 may be formed in a rectangular shape and be combined with the cover member 300 to form the reception space for the bobbin 110 and the housing 140.

A stepped part protruding to a designated thickness in the outward direction may be provided so as to surround the lower edge of the base 210. The designated thickness of the stepped part is the same as the thickness of the side surface of the cover member 300 and, when the cover member 300 is combined with the base 210, the side surface of the cover member 300 may be loaded on, contact, be disposed on, or be combined with the upper surface or side surface of the stepped part. Thereby, the base 210 may guide the cover member 300 combined with the upper portion of the stepped part, and the end of the cover member 300 may be in surface-contact with the stepped part and include the lower surface or the side surface. The stepped part and the end of the cover member 300 may be fixed to each other and sealed by an adhesive agent, etc.

The second grooves 211 may be formed on the stepped part at positions corresponding to the first grooves 310 of the cover member 300. As described above, the second grooves 211 may be combined with the first grooves 310 of the cover member 300 and thus form the recesses, i.e., spaces filled with the adhesive member.

The base 210 may include an opening formed at the central region thereof. The opening may be formed at a position corresponding to the position of the image sensor disposed on the camera module.

Further, the base 210 may include four guide members 216 protruding perpendicularly from four corners to a designated height in the upward direction. The guide members 216 may have a polyprism shape. The guide members 216 may be inserted into, fastened to, or combined with lower guide grooves 148 of the housing 140 which will be described later. Due to the guide members 216 and the lower guide grooves 148, when the housing 140 is loaded or disposed on the base 210, the combined position of the housing 140 on the base 210 may be guided and separation of the housing 140 from a reference position where the housing 140 needs to be mounted, caused by vibration during the operating process of the lens moving apparatus 100 or worker's mistake during the combination process, may be prevented.

As exemplarily shown in FIGS. 4 to 9, the housing 140 may have a column shape with a hollow formed therein (for example, a rectangular prism shape with a hollow). The housing 140 may be configured so as to support at least two driving magnets 130 and the printed circuit board 170 and receive the bobbin 110 such that the bobbin 110 in the housing 140 may move in the first direction against the housing 140.

The housing 140 may include four flat side surfaces 141. The side surfaces 141 of the housing 140 may have an area which is equal to or greater than the area of the driving magnets 130.

As exemplarily shown in FIG. 9, a magnet through hole 141*a* or recess in which the driving magnet 130 is loaded or disposed may be provided on each of two side surfaces opposite each other, among the four side surfaces 141 of the housing 140. The magnet through holes 141*a* or recesses may have a size and a shape corresponding to those of the driving magnets 130 or have a shape to guide the driving magnets 130. A first driving magnet 131 and a second driving magnet 132, i.e., two driving magnets 130, may be mounted on the magnet through holes 141*a*.

Further, a sensor through hole 141*b* into, in, to, or on which a position sensor 180, which will be described later, is inserted, disposed, fixed, or loaded may be provided on one side surface 141 perpendicular to the two side surfaces 141 or other side surfaces 141 than the two side surfaces 141, among the four side surfaces 141 of the housing 140. The sensor through hole 141*b* may have a size and a shape corresponding to those of the position sensor 180, which will be described later. Further, at least one mounting protrusion 149 for mounting, disposition, temporary fixing, or fixing of the printed circuit board 170 may be provided on the side surface 141. The mounting protrusion 149 may be inserted into a mounting through hole 173 formed on the printed circuit board 170, which will be described later. Here, the mounting through hole 173 and the mounting protrusion 149 may be combined with each other by a shape fitting method or an interference fitting method. However, the mounting through hole 173 and the mounting protrusion 149 may have a simple guide function.

Among the four side surfaces 141 of the housing 140, the other side surface 141 opposite to the above side surface 141 may be a flat surface but is not limited thereto.

In accordance with another embodiment, first and second magnet through holes 141*a* and 141*a*' on or to which the driving magnets 130 are located, disposed, or fixed may be provided on two side surfaces opposite each other, among the four side surfaces 141 of the housing 140. Further, a third magnet through hole and a sensor through hole 141*b* separated from the third magnet through hole by a designated distance may be provided on one side surface 141 perpendicular to the two side surfaces 141 or other side surfaces 141 than the two side surfaces 141, among the four side surfaces 141 of the housing 140. Moreover, a fourth magnet through hole may be provided on the other side surface 141 opposite to the side surface 141 among the four side surfaces 141 of the housing 140.

That is, four magnet through holes and one sensor through hole 141*b* may be provided on the four side surfaces 141 of the housing 140.

The first magnet through hole 141*a* and the second magnet through hole 141*a*' have the same size and the same shape, and have a length in the sideward direction which is (almost) the same as the length of the side surfaces 141 of the housing 140 in the sideward direction. On the other hand, the third magnet through hole and the fourth magnet through hole have the same size and the same shape, and may have a length in the sideward direction which is smaller than that of the first magnet through hole 141*a* and the second magnet through hole 141*a*'. Since the sensor through hole 141*b* is formed on the side surface on which the third magnet through hole is formed, such a structure serves to secure a space for the sensor through hole 141*b*.

Of course, the first driving magnet 131 to the fourth driving magnet may be located on, disposed in, or fixed to the first magnet through hole to the fourth magnet through hole. In the same manner, the first driving magnet 131 and the second driving magnet 132 have the same size and the same shape, and have a length in the sideward direction which is (almost) the same as the length of the side surfaces 141 of the housing 140 in the sideward direction. Further, the third driving magnet and the fourth driving magnet have the same size and the same shape, and may have a length in the sideward direction which is smaller than that of the first driving magnet 131 and the second driving magnet 132.

The third magnet through hole and the fourth magnet through hole may be symmetrically disposed on a straight line with respect to the center of the housing 140. That is, the third driving magnet 130 and the fourth driving magnet may be symmetrically disposed on a straight line with respect to the center of the housing 140. If the third driving magnet 130 and the fourth driving magnet 140 opposite to each other are disposed eccentrically at one side regardless of the center of the housing 140, electromagnetic force applied to the coil 120 of the bobbin 110 is biased to the side and thus, the bobbin 110 may be tilted. That is, by symmetrically disposing the third driving magnet 130 and the fourth driving magnet on a straight line with respect to the center of the housing 140, electromagnetic force which is not eccentric may be applied to the bobbin 110 and the coil 1120 and thus, movement of the bobbin 110 in the first direction may be easily and accurately guided.

Further, as exemplarily shown in FIGS. 3 to 6 and FIG. 8, a plurality of first stoppers 143 may protrude from the upper surface of the housing 140. The first stoppers 143 serve to prevent collision between the cover member 300 and the body of the housing 140, and prevent the upper surface of the housing 140 from colliding directly with the upper inner surface of the cover member 300 when external impact is applied. Further, the first stoppers 143 may serve to guide the installed position of the upper elastic member 150. For this purpose, as exemplarily shown in FIG. 9, guide grooves 155 having a shape corresponding to the first stoppers 143 may be formed at positions of the upper elastic member 150 corresponding to the first stoppers 143.

Further, a plurality of upper frame support protrusions 144 with which an outer frame 152 of the upper elastic member 150 is combined may protrude from the upper surface of the housing 140. Although this will be described later, first through holes 152*a* or recesses having a shape corresponding to the upper frame support protrusions 144 may be formed at positions of the outer frame 152 of the upper elastic member 150 corresponding to the upper frame support protrusions 144. The upper frame support protrusions 144 may be fixed to the first through holes 152*a* using an adhesive agent or by fusion and fusion may include thermal fusion or ultrasonic fusion.

Further, as exemplarily shown in FIG. 7, a plurality of lower frame support protrusions 147 with which an outer frame 162 of the lower elastic member 160 is combined may protrude from the lower surface of the housing 140. Insertion recesses 162*a* or holes having a shape corresponding to the lower frame support protrusions 147 may be formed at positions of the outer frame 162 of the lower elastic member 160 corresponding to the lower frame support protrusions 147. The lower frame support protrusions 147 may be fixed to the insertion recesses 162*a* using an adhesive agent or by fusion and fusion may include thermal fusion or ultrasonic fusion.

The driving magnets 130 may be fixed to the magnet through holes 141*a* using an adhesive agent, without being limited thereto. That is, the driving magnets 130 may be fixed to the magnet through holes 141*a* using adhesive members, such as a double-sided tape. Further, in accordance with a modified embodiment, in place of the magnet through holes 141*a*, recess-shaped magnet loading parts may be formed on the inner surface of the housing 140 and the magnet loading parts may have a size and a shape corresponding to the size and the shape of the driving magnets 130.

The driving magnets 130 may be installed at positions corresponding to the coil 120 provided on the bobbin 110. Further, the driving magnet 130 may be formed in one body. In this embodiment, the driving magnet 130 may be configured such that the north (N) pole is formed on the surface of the driving magnet 130 opposite the coil 120 of the bobbin 110 and the south (S) pole is formed on the other surface of the driving magnet 130. However, the disclosure is not limited thereto and the driving magnet 130 may be configured such that the N pole and the S pole are reversed. Further, the driving magnet 130 may be split into two sections along the plane vertical to the optical axis.

The driving magnet 130 may have a rectangular parallelepiped structure having a designated width and be loaded in the magnet through hole 141*a* or recess so that the wide surface of the driving magnet 130 may form a part of the side surface 141 of the housing 140. Here, the opposite driving magnets 130 may be installed in parallel. Further, the driving magnets 130 may be disposed opposite the coil 120 of the bobbin 110. The opposite surfaces of the driving magnet 130 and the coil 120 of the bobbin 110 may be disposed in parallel, without being limited thereto. That is, according to design, only one of the opposite surfaces of the driving magnet 130 and the coil 120 of the bobbin 110 may be a flat surface and the other may be a curved surface. Otherwise, both of the opposite surfaces of the driving magnet 130 and the coil 120 of the bobbin 110 may be curved surfaces and, in this case, the opposite surfaces of the driving magnet 130 and the coil 120 of the bobbin 110 may have the same curvature.

As described above, the sensor through hole 141*b* or recess is provided on one side surface 141 of the housing 140, and the position sensor 180 is inserted into, disposed in, or loaded in the sensor through hole 141*b* and electrically connected to one surface of the printed circuit board 170 by soldering. That is, the printed circuit board 170 may be fixed to, supported by, or disposed on the outer surface of one side surface 141 with the sensor through hole 141*b* or recess among the four side surfaces 141 of the housing 140.

The position sensor 180 and a sensing magnet 190 of the bobbin 110, which will be described later, may form a sensing unit to judge a first displacement value of the bobbin 110 in the first direction. For this purpose, the position sensor and the sensor through hole 141*b* or recess may be disposed at a position corresponding to the position of the sensing magnet 190.

The position sensor 180 may be a sensor sensing change of magnetic force emitted from the sensing magnet 190 of the bobbin 110. Further, the position sensor 180 may be a Hall sensor. However, the position sensor 180 is not limited thereto and any sensor which may sense change of magnetic force or any sensor which may sense a position instead of magnetic force, for example, a photoreflector, may be used.

The printed circuit board 170 is combined with or disposed on one side surface 141 of the housing 140 and may include the mounting through hole 173 or recess, as described above. Thus, the installed position of the printed circuit board 170 may be guided by the mounting protrusion 149 provided on the side surface 141 of the housing 140.

Further, a plurality of terminals 171 is disposed on the printed circuit board 170. The terminals 171 may receive external power and supply current to the coil 120 of the bobbin 110 and the position sensor 180. The number of the terminals 171 formed on the printed circuit board 170 may be increased or decreased according to kinds of components which need to be controlled. In accordance with this embodiment, the printed circuit board 170 may be an FPCB.

The printed circuit board 170 may include a controller readjusting the amount of current applied to the coil 120 based on the first displacement value sensed by the sensing unit. The controller is mounted on the printed circuit board 170. Further, in accordance with another embodiment, a controller is not mounted on the printed circuit board 170 and may be mounted on another substrate and such a substrate may be a substrate on which the image sensor of the camera module is mounted or another separate substrate.

Calibration of an actuator driving distance may be additionally carried out based on a Hall voltage difference to change of a magnetic flux density detected by the Hall sensor.

The bobbin 110 may be configured so as to reciprocate in the first axis direction with respect to the housing 140 fixed in the first axis direction. An auto-focusing function may be executed by movement of the bobbin 110 in the first axis direction.

The bobbin 110 will be described in more detail later with reference to the accompanying drawings.

The upper elastic member 150 and the lower elastic member 160 may elastically support the ascending and/or descending operation of the bobbin 110 in the optical axis direction. Plate springs may be used as the upper elastic member 150 and the lower elastic member 160.

As exemplarily shown in FIGS. 2 to 4 and FIGS. 9 and 10, the upper elastic member 150 and the lower elastic member 160 may include inner frames 151 and 161 combined with the bobbin 110, outer frames 152 and 162 combined with the housing 140, and connection parts 153 and 163 connecting the inner frames 151 and 161 and the outer frames 152 and 162.

The connection parts 153 and 163 may be bent at least one time and form a pattern with a designated shape. The ascending and/or descending operation of the bobbin 110 in the optical axis direction, i.e., the first direction, may be elastically (flexibly) supported through position change and fine deformation of the connection parts 153 and 163.

In accordance with this embodiment, as exemplarily shown in FIG. 9, the upper elastic member 150 may include a plurality of first through holes 152a formed on the outer frame 152 and a plurality of second through holes 151a formed on the inner frame 151.

The first through holes 152a may be combined with the upper frame support protrusions 144 provided on the upper surface of the housing 140, and the second through holes 151a or recesses may be combined with upper support protrusions 113 provided on the upper surface of the bobbin 110, which will be described later. That is, the outer frame 152 may be fixed to and combined with the housing 140 through the first through hole 152a and the inner frame 151 may be fixed to and combined with the bobbin 110 through the second through holes 151a or recesses.

The connection parts 153 may connect the inner frame 151 and the outer frame 152 so that the inner frame 151 may be elastically deformed within a designated range in the first direction with respect to the outer frame 152.

At least one of the inner frame 151 and the outer frame 152 of the upper elastic member 150 may include at least one terminal part elastically connected to at least one of the coil 120 of the bobbin 110 and the printed circuit board 170.

As exemplarily shown in FIG. 10, the lower elastic member 160 may include a plurality of insertion recesses 162a or holes formed on the outer frame 162 and a plurality of third through holes 161a or recesses formed on the inner frame 161.

The insertion recesses 162a or holes may be combined with the lower frame support protrusions 147 provided on the lower surface of the housing 140, and the third through holes 161a or recesses may be combined with lower support protrusions 114 provided on the lower surface of the bobbin 110, which will be described later. That is, the outer frame 162 may be fixed to and combined with the housing 140 through the insertion recesses 162a or holes and the inner frame 161 may be fixed to and combined with the bobbin 110 through the third through holes 161a or recesses.

The connection parts 163 may connect the inner frame 161 and the outer frame 162 so that the inner frame 161 may be elastically deformed within a designated range in the first direction with respect to the outer frame 162.

The lower elastic member 160 may include a first lower elastic member 160a and a second lower elastic member 160b separated from each other, as exemplarily shown in FIG. 10. Through such a two-split structure, the first lower elastic member 160a and the second lower elastic member 160b of the lower elastic member 160 may receive power having different polarities or different powers. That is, after the inner frame 161 and the outer frame 162 are combined with the bobbin 110 and the housing 140, solder parts may be provided at positions of the inner frame 161 corresponding to both ends of the coil 120 disposed on the bobbin 110 and conductive connection, such as soldering, is performed at the solder parts and thus, the first lower elastic member 160a and the second lower elastic member 160b may receive power having different polarities or different powers. Further, the first lower elastic member 160a is electrically connected to one of both ends of the coil 120 and the second lower elastic member 160b is electrically connected to the other and thus, the first lower elastic member 160a and the second lower elastic member 160b may receive current and/or voltage supplied from the outside.

The upper elastic member 150, the lower elastic member 160, the bobbin 110, and the housing 140 may be assembled by bonding using thermal fusion and/or an adhesive agent. Here, based on an assembly sequence, fixing using thermal fusion may be carried out and then, fixing may be finished through bonding using an adhesive agent.

In accordance with a modified embodiment, the upper elastic member 150 may have a two-split structure and the lower elastic member 160 may have an integrated structure.

At least one of the inner frame 161 and the outer frame 162 of the lower elastic member 160 may include at least one terminal part electrically connected to at least one of the coil 120 of the bobbin 110 and the printed circuit board 170.

FIG. 11 is a schematic perspective view of the bobbin 110 in accordance with the embodiment, FIG. 12 is a schematic perspective bottom view of the bobbin 110 in accordance with the embodiment, FIG. 13 is a schematic exploded perspective view of the bobbin 110 in accordance with the embodiment, FIG. 14 is a partially enlarged perspective view of FIG. 13, FIG. 15 is a partially enlarged bottom view of FIG. 13, FIG. 16 is a partially enlarged perspective view of a reception recess 117 in accordance with the embodiment, and FIG. 17 is a schematic longitudinal-sectional view of the bobbin 110 in accordance with the embodiment.

As exemplarily shown in FIGS. 11 to 17, the bobbin 110 may be installed so as to reciprocate in the optical axis direction in the inner space of the housing 140. The coil 120, which will be described later, is installed on the outer surface of the bobbin 110. The coil 120 may electromagnetically interact with the driving magnets 130 of the housing 140 and thus, the bobbin 110 may reciprocate in the first direction due to electromagnetic interaction between the coil 120 and the driving magnets 130. Further, the bobbin 110 may be elastically (flexibly) supported by the upper elastic member 150 and the lower elastic member 160 and move in the optical axis direction, i.e., in the first direction, thus performing an auto-focusing function.

The bobbin 110 may include a lens barrel (not shown) in which at least one lens is installed, and the lens barrel is an element of the camera module, which will be described later, but is not essential to the lens moving apparatus. The lens barrel may be combined with the inside of the bobbin 110 through various methods. For example, a female screw thread may be formed on the inner surface of the bobbin 110, a male screw thread may be formed on the outer surface of the lens barrel, and the lens barrel may be combined with the bobbin 110 through screw combination between the female screw thread and the male screw thread. However, the disclosure is not limited thereto, and the lens barrel may be fixed directly to the inside of the bobbin 110 through other methods except for the screw combination method without a screw thread formed on the inner surface of the bobbin 110. Otherwise, one or more lenses may be formed integrally with the bobbin 110 without a lens barrel. One lens may be combined with the lens barrel or two or more lens combined with the lens barrel may form an optical system.

Further, a plurality of upper support protrusions 113 and a plurality of lower support protrusions 114 may protrude from the upper surface and the lower surface of the bobbin 110.

The upper support protrusions 113 may have a cylindrical shape or a prism shape, and combine and fix the inner frame 151 of the upper elastic member 150 with and to the bobbin 110, as exemplarily shown in FIG. 11. In accordance with this embodiment, the second through holes 151a or recesses may be formed at positions of the inner frame 151 of the upper elastic member 150 corresponding to the upper support protrusions 113. The upper support protrusions 113 and the second through holes 151a or recesses may be fixed through thermal fusion or using an adhesive member, such as epoxy. Further, the upper support protrusions 113 may be provided in plural. A separation distance between the upper support protrusions 113 may be properly adjusted within a range of avoiding interference with peripheral parts. That is, the upper support protrusions 113 may be disposed at regular intervals symmetrically with respect to the center of the bobbin 110, or the upper support protrusions 113 may be disposed at irregular intervals symmetrically with respect to a specific virtual line passing through the center of the bobbin 110.

The lower support protrusions 114 may have a cylindrical shape or a prism shape, in the same manner as the above-described upper support protrusions 113, and combine and fix the inner frame 161 of the lower elastic member 160 with and to the bobbin 110, as exemplarily shown in FIG. 12. In accordance with this embodiment, the third through holes 161a or recesses may be formed at positions of the inner frame 161 of the lower elastic member 160 corresponding to the lower support protrusions 114. The lower support protrusions 114 and the third through holes 161a or recesses may be fixed through thermal fusion or using an adhesive member, such as epoxy. Further, the lower support protrusions 114 may be provided in plural, as exemplarily shown in FIG. 12. A separation distance between the lower support protrusions 114 may be properly adjusted within a range of avoiding interference with peripheral parts. That is, the lower support protrusions 114 may be disposed at regular intervals symmetrically with respect to the center of the bobbin 110.

Upper escape recesses 112 and lower escape recesses 118 are formed at positions of the upper surface and the lower surface of the bobbin 110 corresponding to the connection parts 153 of the upper elastic member 150 and the connection parts 163 of the lower elastic member 160.

The upper escape recesses 112 and the lower escape recesses 118 remove spatial interference between the connection parts 153 and 163 and the bobbin 110 when the bobbin 110 moves in the first direction with respect to the housing 140, thus facilitating elastic deformation of the connection parts 153 and 163. Further, although this embodiment describes the upper escape recesses 112 as being disposed at the corners of the housing 140, the upper escape recesses 112 may be disposed on the side surfaces 141 of the housing 140 according to shapes and/or positions of the connection parts 153 of the upper elastic member 150.

Further, a coil loading groove 116 in which the coil 120 is installed may be provided on the outer surface of the bobbin 110, or only a loading part may be provided.

The coil 120 may be provided as a ring-shaped coil block inserted into or combined with the outer surface of the bobbin 110, the coil loading groove 116, or the loading part, but is not limited thereto. The coil 120 may be wound directly on the outer surface of the bobbin 110, the coil loading groove 116, or the loading part.

In accordance with this embodiment, the coil 120 may be formed in an approximately octagonal shape, as exemplarily shown in FIG. 13. Such a shape corresponds to the shape of the outer surface of the bobbin 110, and the bobbin 110 may be formed also in an octagonal shape. Further, at least four surfaces of the coil 120 may be flat surfaces and corner parts of the coil 120 interconnecting the surfaces may be rounded surfaces or flat surfaces. The flat surfaces may be surfaces corresponding to the driving magnets 130. Further, the surfaces of the driving magnets 130 corresponding to the coil 120 may have the same curvature as the curvature of the coil 120. That is, if the surfaces of the coil 120 are flat surfaces, the corresponding surfaces of the driving magnets 130 may be flat surfaces and, if the surfaces of the coil 120 are curved surfaces, the corresponding surfaces of the driving magnets 130 may be curved surfaces and have the same curvature as the curvature of the surfaces of the coil 120. Further, even if the surfaces of the coil 120 are curved surfaces, the corresponding surfaces of the driving magnets 130 may be flat surfaces, or vice versa.

The coil 120 serves to move the bobbin 110 in the optical axis direction to perform an auto-focusing function. When current is supplied, the coil 120 may generate electromagnetic force through electromagnetic interaction with the driving magnets 130 and then move the bobbin 120 through the generated electromagnetic force.

The coil 120 may correspond to the driving magnets 130. As exemplarily shown in the drawings, if the driving magnet 130 is formed to have an integral body and the entire surface of the driving magnet 130 opposite the coil 120 has the same polarity, the surface of the coil 120 corresponding to the driving magnet 130 may have the same polarity. Although not shown in the drawings, if the driving magnet 130 is split into two sections along a surface vertical to the optical axis so that the surface of the driving magnet 130 opposite the coil 120 is divided into two or more sections, the coil 120 may be divided also into sections corresponding in number to the divided sections of the driving magnet 130.

The bobbin 110 may include the sensing magnet 190 which, together with the position sensor 180 of the housing 140, forms the sensing unit. The sensing magnet 190 may be fixed to, disposed on, or combined with the bobbin 110. Thereby, when the bobbin 110 moves in the first direction, the sensing magnet 190 may move in the first direction by the same displacement as the bobbin 110. Further, the sensing magnet 190 may be formed in one body and disposed such that the upper portion of the bobbin 110 becomes the N pole and the lower portion of the bobbin 110 becomes the S pole. However, the disclosure is not limited thereto and vice versa. Further, the sensing magnet 190 may be split into two sections along a plane vertical to the optical axis.

The sensing magnet 190 may be formed in a size which does not influence the magnetic flux density of the driving magnets 130 corresponding to electromagnetic force driving the coil 120 so as not to influence the functions of the bobbin 110 and the coil 120. Therefore, the sensing magnet 190 may be a magnet for Hall sensors or a subsidiary magnet having a smaller size than the driving magnets 130. Such a size of the sensing magnet 190 may be ⅕ the size of the driving magnets 130. However, since the sensing magnet 190 may be formed in a size which does not influence magnetic force of the driving magnets 130, the sensing magnet 190 may be formed in a size less than or more than ⅕ the size of the driving magnets 130.

As exemplarily shown in FIGS. 13 to 17, the bobbin 110 may have a reception recess 117 formed on the outer surface of the bobbin 110 so as to receive the sensing magnet 190.

The reception recess 117 may be formed on the outer surface of the bobbin 110 to a designated depth in the inward direction of the bobbin 110.

In more detail, the reception recess 117 may be formed on one side surface of the bobbin 110 such that at least a part of the reception recess 117 is located at the inside of the coil 120. Further, at least a part of the reception recess 117 may be depressed more than the coil loading groove 116 to a designated depth in the inward direction of the bobbin 110. By forming the reception recess 117 in the inward direction of the bobbin 110, the sensing magnet 190 may be received in the bobbin 110 and thus, a separate space for installation of the sensing magnet 190 is not required and space utilization of the bobbin 110 may be improved.

Particularly, the reception recess 117 may be disposed at a position corresponding to the position sensor 180 of the housing 140 (or a position opposite the position sensor 180). Thereby, a distance between the sensing magnet 190 and the position sensor 180 includes the thickness of the coil 120 and/or a separation distance between the coil 120 and the position sensor 180 and may thus be minimized and thus, accuracy in sensing of magnetic force by the position sensor 180 may be improved.

The reception recess 117 may include an opening 119 formed on one of the upper surface and the lower surface of the bobbin 110 and communicating with the reception recess 117. For example, as exemplarily shown in FIG. 17, a part of the lower surface of the bobbin 110 may be opened and form the opening 119 and the opening 119 may form the inlet of the reception recess 117. The sensing magnet 190 may be inserted into, disposed in, or fixed to the reception recess 117 through the opening 119, and be separated from the reception recess 117 through the opening 119.

In more detail, as exemplarily shown in FIGS. 15 to 17, the reception recess 117 may include an inner surface supporting one surface of the sensing magnet 190 and an adhesive groove 117b depressed more inwardly than the inner surface to a designated depth such that an adhesive agent is injected into the adhesive groove 117b.

The inner surface is one surface located in the inward direction toward the center of the bobbin 110 and, if the sensing magnet 190 has a rectangular parallelepiped shape, the wide surface of the sensing magnet 190 contacts or is loaded on the inner surface.

The adhesive groove 117b may be formed by depressing a part of the inner surface in the inward direction toward the center of the bobbin 110. The adhesive groove 117b may be formed from the opening 119 to one inner surface of the bobbin 110 contacting one surface of the sensing magnet 190.

As exemplarily shown in FIG. 17, the adhesive groove 117b may include a first additional groove 117c formed to have a greater length than the length of the sensing magnet 190 in the thickness direction of the bobbin 110. That is, the first additional groove 117c is an extension part of the adhesive groove 117 depressed more than one inner surface of the bobbin 110 contacting the other surface of the sensing magnet 190. By forming the first additional groove 117c, when the adhesive agent is injected into the adhesive groove 117b through the opening 119, the adhesive agent fills the inside of the adhesive groove 117b starting from the first additional groove 117c. Thereby, flow of the adhesive groove 117b to the coil 120 along a gap between the sensing magnet 190 and the reception recess 117 due to overflow of the adhesive agent from the adhesive groove 117b may be prevented and thus, an error generation rate of the lens moving apparatus 100 during a process of combining the sensing magnet 190 with the bobbin 110 may be reduced.

Further, the adhesive groove 117b may further include a second additional groove 117a formed to a designated depth in the inward direction from the opening 119 toward the center of the bobbin 110. That is, the second additional groove 117a may be formed around the opening 119 more deeply than the inner surface in the inward direction toward the center of the bobbin 110. The second additional groove 117a communicates with the adhesive groove 117b. That is, the second additional groove 117a is an extension part of the adhesive groove 117b. By forming the second additional groove 117a, the adhesive agent may be injected into the adhesive groove 117b through the second additional groove 117a. Thereby, adhesion of the adhesive agent to other elements of the bobbin 110, such as the coil 120, due to overflow of the adhesive agent around the opening 119 may be prevented and thus, an error generation rate of the lens moving apparatus 100 during a process of combining the sensing magnet 190 with the bobbin 110 may be reduced.

Further, in accordance with a modified embodiment, the second additional groove 117a may be provided directly on the bobbin 110 without the adhesive groove 117b. In this case, the sensing magnet 190 may be combined with and fixed to the bobbin 110 by injecting the adhesive agent into the second additional groove 117a.

The adhesive groove 117b may include at least one of the first additional groove 117c and the second additional groove 117a. That is, the adhesive groove 117b may include only the first additional groove 117c or include only the second additional groove 117a.

In accordance with another modified embodiment, a depth between the inner surface of the reception recess 117 supporting one surface (i.e., the wide surface) of the sensing magnet 190 and the outer surface of the bobbin 110 having the coil 120 (i.e., the surface of the coil loading groove 116) may be less than the thickness of the sensing magnet 190. Thereby, the sensing magnet 190 may be fixed to the inside of the reception recess 117 by inward pressing force of the coil 120 due to winding of the coil 120. In this case, an adhesive agent does not need to be used.

In accordance with an additional embodiment, although not shown in the drawings, the bobbin 110 may further an additional reception recess 117 formed on the outer surface of the bobbin 110 at a position symmetrical to the reception recess 117 with respect to the center of the bobbin 110, and a weight balance member received in the additional reception recess 117.

That is, the additional reception recess 117 may be formed to a designated depth in the inward direction of the bobbin 110 on the outer surface of the bobbin 110 at a position symmetrical to the reception recess 117 on a straight line with respect to the center of the bobbin 110. Further, the weight balance member is fixed to and combined with the inside of the additional reception recess 117 and has the same weight as the sensing magnet 190.

By providing the additional reception recess 117 and the weight balance member, the weight balance member may compensate for weight unbalance of the bobbin 110 in the horizontal direction caused by the reception recess 117 and the sensing magnet 190.

The additional reception recess 117 may include at least one of an adhesive groove 117b, a first additional groove 117c, and a second additional groove 117a.

FIG. 18 is a view illustrating a position sensor 180 in a mounted state in accordance with another embodiment. In accordance with this embodiment, the position sensor 180 may be provided on the inner surface of the cover member 300.

With reference to FIG. 18, if the position sensor 180 is disposed on the inner surface of the cover member 300, the lower end of the position sensor 180 is connected to the printed circuit board 170 so as to communicate with the printed circuit board 170 and may thus receive power supplied from the printed circuit board 170.

FIG. 19 is a view illustrating magnetic bodies in a mounted state in accordance with one embodiment. In this embodiment, the lens moving apparatus 100 may further include magnetic bodies 500.

The magnetic bodies 500 may be mounted on the driving magnets 130, be located between the driving magnets 130 and the coil 120, and surface-contact the coil 120 and thus provide frictional force to movement of the bobbin 110 and the coil 120.

The magnetic bodies 500 may be formed of a metal, such as an iron plate, so as to be attached to the driving magnets 130 by magnetic force, and support separation spaces between the coil 120 and the driving magnets 130 to reduce a pose difference (shaking of the bobbin 110) caused by change of the position of the lens moving apparatus 100. Therefore, two or more magnetic bodies 500 may be mounted on the inner surfaces of the driving magnets 130 so as to be opposite each other.

Therefore, the magnetic bodies 500 reduce a pose difference of the lens moving apparatus 100 and do not require the lens unit to continuously apply power to the coil 120 to maintain a specific position. Further, since the magnetic bodies 500 perform the function of an elastic unit, the lens moving apparatus 100 may be operated without a separate elastic unit, such as the upper and lower elastic members 150 and 160, miniaturization of the lens moving apparatus 100 in the first direction and effective utilization of the inner space of the lens moving apparatus 100 may be achieved.

Therefore, the lens moving apparatus 100 in accordance with this embodiment includes the magnetic bodies 500 and thus exhibits prevention of eccentricity of the bobbin 110 and the function of the upper and lower elastic members 150 and 160, thus having improved reliability.

As described above, the lens moving apparatus 100 in accordance with this embodiment may readjust the position of a lens in the optical axis direction through feedback of the displacement of the lens in the optical axis direction and thus shorten a focus alignment time of the lens.

Further, the lens moving apparatus 100 in accordance with this embodiment may minimize an interval between the sensing magnet provided on a movable body, i.e., the bobbin, and the position sensor provided on a fixed body, i.e., the housing, more accurately sense the displacement of the lens in the optical axis direction, and thus more accurately and rapidly locate the lens at the focal distance of the lens.

Further, the lens moving apparatus 100 in accordance with this embodiment locates the sensing magnet in the bobbin and locates the position sensor in the housing and does not require a separate space for mounting of the sensing unit, thus improving space utilization of the camera module (particularly, the bobbin).

Further, the lens moving apparatus 100 in accordance with this embodiment may include the lens combined with the lens moving apparatus 100, provide the camera module disposed thereunder and including the image sensor and the printed circuit board on which the image sensor is disposed, and combine the base of the lens moving apparatus with the printed circuit board.

Further, the camera module may further include the camera module controller and the camera module controller may compare a first displacement value, calculated based on the current change value sensed by the sensing unit, with the focal distance of the lens according to the distance between a subject and the lens. Thereafter, the camera module controller, if the first displacement value or the current position of the lens does not correspond to the focal distance of the lens, readjusts an amount of current applied to the coil 120 of the bobbin 110 and may thus move the bobbin 110 by a second displacement in the first direction. Further, in the sensing unit, the position sensor 180 fixed to a fixed body, i.e., the housing 140, may sense change of magnetic force emitted from the sensing magnet 190 according to movement of the sensing magnet 190 fixed to a movable body, i.e., the bobbin 110, a separate driver IC or the camera module controller may calculate or judge the current position or the first displacement of the bobbin 110 based on change of current output based on the sensed change of magnetic force, the current position or the first displacement of the bobbin 110, calculated or judged by the sensing unit, is transmitted to the controller of the printed circuit board 170, and the controller may redetermine the position of the bobbin 110 for auto-focusing and thus adjust an amount of current applied to the coil 120.

Embodiment 2

FIG. 20 is a schematic side view of a lens moving apparatus in accordance with another embodiment. With reference to FIG. 20, in the lens moving apparatus in accordance with this embodiment, instead of driving magnets 130 having a comparatively high weight, a coil 120 is wound on a bobbin 110 fixing a lens unit 10, a sensing magnet 190 is mounted on the bobbin 110, and a position sensor 180 performs accurate and rapid feedback so as to adjust a focus.

Further, the lens moving apparatus in accordance with this embodiment includes magnetic bodies 500 and thus exhibits prevention of eccentricity of a movable element 100 and the function of an elastic unit, thus having improved reliability. Hereinafter, this embodiment will be described in detail with reference to the accompanying drawings.

FIG. 21 is a perspective view of the lens moving apparatus in accordance with the embodiment, FIG. 22 is a perspective view of the lens moving apparatus of FIG. 20, from which a yoke unit 320 is removed, FIG. 23 is an exploded perspective view of the lens moving apparatus in accordance with the embodiment, and FIG. 24 is a view illustrating a cover member 300 in accordance with the embodiment, as seen from the bottom. With reference to FIGS. 21 to 24, the lens moving apparatus in accordance with this embodiment may include a movable element 100 and a cover member 300.

The movable element 100 includes a bobbin 110 and a coil 120. The bobbin 110 is combined with the lens unit 10 and thus fixes the lens unit 10. The lens unit 10 and the bobbin 110 may be combined through screw combination using screw threads 111 respectively formed on the inner surface of the bobbin 110 and the outer surface of the lens unit 10, as exemplarily shown in FIG. 22, or be combined using an adhesive agent without formation of screw threads. Of course, the bobbin 110 and the lens unit 10 may be more firmly combined using the adhesive agent after screw combination has been completed.

Further, guide parts 112 guiding winding or mounting of the coil 120, which will be described later, may be formed on the outer surface of the bobbin 110. The guide parts 112 may be formed integrally with the outer surface of the bobbin 110 and be formed continuously along the outer surface of the bobbin 110 or be formed so as to be separated by designated intervals.

Further, fastening protrusions 113 to which an upper elastic member and/or a lower elastic member to support the bobbin 110 above the base 210 are fastened may be formed on the upper surface and/or the lower surface of the bobbin 110.

Further, a recess 114 to locate a yoke unit 320, which will be described later, between the bobbin 110 and the coil 210 wound on the bobbin 110 may be formed on the outer surface of the bobbin 110.

The lens unit 10 may be a lens barrel but is not limited thereto. That is, the lens unit 10 may include any holder structure which may support lenses. In this embodiment, a lens barrel will be exemplarily described as the lens unit 10. The lens unit 10 is installed on a printed circuit board (not shown), which will be described later, and is disposed at a position corresponding to an image sensor. The lens unit 10 includes one or more lenses (not shown).

The coil 120 may be guided by the guide parts 12 and wound on the outer surface of the bobbin 110, or four respective coils may be arranged at intervals of 90° on the outer surface of the bobbin 110. The coil 120 may receive power supplied from the printed circuit board, which will be described later, and form an electromagnetic field.

The cover member 300 may include the driving magnets 130, the yoke unit 320, and the base 210.

The driving magnets 130 may be mounted on the yoke unit 320 so as to be disposed at positions corresponding to the outer surface of the coil 120. As exemplarily shown in FIG. 22, the driving magnets 130 may be mounted at four corners of the inside of the yoke unit 320 at the same interval and thus facilitate effective utilization of the inner volume of the yoke unit 320.

Although the driving magnets 130 may have a triangular prism shape, the inner surface of which is curved, as exemplarily shown in FIG. 22, the driving magnets 130 may have a prism shape, such as a rectangular prism or a trapezoidal prism, according to inner structural change.

The yoke unit 320 forms the external appearance of the lens moving apparatus, an opening having a greater diameter than the diameter of the bobbin 110 is formed on the upper surface of the yoke unit 320, and the lower surface of the yoke unit 320 is opened. Here, magnet fixing parts 322 bent in the downward direction to fix the driving magnets 130 may be formed at the opening, and a terminal groove 323 corresponding to a terminal part 182 of a position sensor 180, which will be described later, may be formed on the end of a side surface of the yoke unit 320 so as to expose the terminal part 182 to the outside.

Such a yoke unit 320 receives an elastic unit, which will be described later, the movable element 100 and the cover member 200 and is mounted on the base 210, thus forming the external appearance of a camera module. In more detail, the yoke unit 320 is mounted on the base 210 such that the inner surface of the yoke unit 320 is adhered to the side surface of the base 210, which will be described later, and has both a function of protecting inner components of the camera module and a function of preventing external contaminants from being introduced into the camera module.

Further, the yoke unit 320 needs to perform a function of protecting the components of the camera module from interference with external waves generated from a cellular phone. Therefore, the yoke unit 320 may be implemented as a cover can formed of a metal.

Further, although not shown in the drawings, the yoke unit 320 includes at least one extended fastening piece on each surface of the lower end thereof and the base 210 includes fastening recesses into which the fastening pieces are inserted and thus, firm sealing and fastening effects of the camera module may be achieved.

The base 320 may be disposed at the lower portion of the lens moving apparatus so as to support the yoke unit 320 and the movable element 100.

In more detail, the base 210 supports the cover member 300 and the movable element 100, a recess 211 having a circular shape and depressed downwards is formed at the center of the base 210 so that bobbin 110 may be located in the recess 211, a loading groove 211a to load the position sensor 180, which will be described alter, is formed at the side of the recess 211, and a through hole 211b corresponding to the lens unit 110 may be formed at the center of the base 210.

The base 210 may perform the function of a sensor holder protecting a image sensor (not shown), which will be described later, and the through hole 211b may be provided to locate a filter (not shown). In this case, the filter may be an infrared filter. Further, the filter may be formed of a film or glass. The filter may be formed by applying an IR cut-off coating material to a flat panel type optical filter, such as a cover glass for protecting a photographing surface. Further, in addition to the base 210, a separate sensor holder may be additionally located under the base 210.

One or more fixing protrusions 212 surface-contacting or combined with the inner surface of the yoke unit 320 may be formed at corners of the upper surface of the base 210. The fixing protrusions 212 may perform guiding of the yoke unit 320 and firm fixing of the yoke unit 320 after guiding.

Further, fastening protrusions 213 to which a lower elastic member, which will be described later, is fastened may be formed on the upper surface 210.

Further, although not shown in the drawings, the fastening recesses into which the fastening pieces of the yoke unit 320 are inserted may be formed on the base 210. Such fastening recesses may be formed in a shape corresponding to the length of the fastening pieces. The fastening recesses may be formed locally on the outer surface of the base 210, or be formed throughout the outer surface of the base 210 so that a designated part of the lower end of the cover can including the fastening pieces may be inserted thereinto.

The lens moving apparatus in accordance with this embodiment includes the sensing magnet 190 and the position sensor 180 and may thus detect position information of the movable element 100 and perform feedback of the position information, thereby more rapidly and accurately achieving lens movement.

The sensing magnet 190 may be provided at one side of the bobbin 110. Here, one side means a part of the side surface of the bobbin 110, and the sensing magnet 190 may be inserted into the lower portion of the side surface of the bobbin 110, as exemplarily shown in FIG. 20, or be mounted in a recess formed at the upper region, the lower region, or the center of the bobbin 110.

The sensing magnet 190 may be formed in a size which does not influence the magnetic flux density of the driving magnets 130 corresponding to electromagnetic force driving the coil 120 so as not to influence the functions of the movable element 100. Therefore, the sensing magnet 190 may be a magnet for Hall sensors or a subsidiary magnet having a smaller size than the driving magnets 130. Such a size of the sensing magnet 190 may be ⅕ the size of the driving magnets 130. However, since the sensing magnet 190 may be formed in a size which does not influence magnetic force of the driving magnets 130, the sensing magnet 190 may be formed in a size less than or more than ⅕ the size of the driving magnets 130.

In this embodiment, since the sensing magnet 190 is provided and thus, instead of the driving magnets 130, the coil 120 may be disposed on the movable element 100, the movable element 100 may be lightweight. Such a movable element 100 may reduce eccentricity of the lens unit 10 even if a user locates the camera module at any position, and the lens moving apparatus may achieve more free inner structure utilization than a conventional lens moving apparatus through rapid and precise control of the lightweight movable element 100 and the arrangement structure of the position sensor 180.

The position sensor 180 is provided to sense movement of the sensing magnet 190 and to precisely control the movable element 100, and at least one position sensor 180 may be provided.

The position sensor 180 may be located closer to the coil than the sensing magnets 190. When taking into consideration that the intensity of a magnetic field formed by a magnet is several hundreds times the intensity of an electromagnetic field formed by a coil, influence of the coil 120 is not considered in sensing of movement of the sensing magnet 190.

The position sensor 180 may be disposed so as to correspond to the sensing magnet 190. The position sensor 180 may be disposed under the sensing magnet 190, as exemplarily shown in FIG. 20, or be disposed outside the sensing magnet 190, as exemplarily shown in FIG. 21 or 24.

In the case of the former, the position sensor 180 may be loaded in the loading groove 211a of the recess 211 formed on the base 210, as exemplarily shown in FIG. 23. In the case of the latter, the position sensor 180 may be provided on the inner surface of the yoke unit 320, as exemplarily shown in FIGS. 21 and 24.

The position sensor 180 may include a Hall sensor 181 disposed so as to correspond to the sensing magnet 190 and the terminal part 182 electrically connected to the Hall sensor 181 and receiving power supplied from the outside. With reference to FIG. 24, if the position sensor 180 is disposed on the side surface of the yoke unit 320, the terminal part 182 may be exposed from the terminal groove 323 formed on the end of the side surface of the yoke unit 320 and receive external power from the printed circuit board (not shown). Further, as exemplarily shown in FIG. 20, if the position sensor 180 is disposed on the upper surface of the base 210, the terminal part 182 may be mounted on a separate flexible printed circuit board (FPCB; not shown) on the base 210 and receive power from the FPCB.

Further, although not shown in the drawings, the lens moving apparatus in accordance with this embodiment may further include an elastic unit. The elastic unit includes an upper elastic member and a lower elastic member.

Although each of the upper elastic member and the lower elastic member may include separate elastic members disposed on respective sides of the housing, each of the upper elastic member and the lower elastic member may be formed of a single plate which is bent and cut, for efficiency of manufacture.

The upper elastic member is fastened to the upper surface of the yoke unit 320 and the upper surface of the bobbin 110 and supports the bobbin 110. In order to provide restoring force to the bobbin 110 when the bobbin 110 moves upwards, the upper elastic member is provided at the upper end of the yoke unit 320. In more detail, the upper elastic member is disposed at the upper end of the yoke unit 320, protrudes from the opening formed at the upper end of the yoke unit 320 in the inward direction to have a designated area, and the protruding part of the upper elastic member supports the upper end of the bobbin 110.

Since the yoke unit 320 may be formed of a metal, an insulating plate 324 formed of an insulating material may be provided between the yoke unit 320 and the upper elastic member. Further, a lid 325 formed in a shape corresponding to the upper surface of the yoke unit 320 may be mounted on the upper end of the upper elastic member.

Corresponding holes are formed on the lid 325, the upper elastic member, the insulating plate 324, and the upper surface of the yoke unit 320 and thus, the lid 325, the upper elastic member, the insulating plate 324, and the yoke unit 320 may be fastened using an adhesive agent applied to the holes.

The edge of the lower elastic member is supported by the upper surface of the base 210, and the inner circumferential part of the lower elastic member supports the lower end of the bobbin 110. In more detail, the lower elastic member may include two corresponding plate springs, and the plate springs may be electrically connected to one end and the other end of the coil 120 wound on the bobbin 110 and thus transmit power to the coil 120. That is, the lower elastic member may include separate plate springs for input and output of power that are symmetrical with respect to the optical axis. Of course, the upper elastic member may be formed in the same manner as the lower elastic member.

The lens moving apparatus in accordance with this embodiment may further include magnetic bodies 500. The magnetic bodies 500 may be mounted on the driving magnets 130, be located between the driving magnets 130 and the coil 120, and surface-contact the coil 120 and thus provide frictional force to movement of the movable element 100.

The magnetic bodies 500 may be formed of a metal, such as an iron plate, so as to be attached to the driving magnets 130 by magnetic force, and support separation spaces between the coil 120 and the driving magnets 130 to reduce a pose difference (shaking of the movable element 100) caused by change of the position of the lens moving apparatus 100. Therefore, two or more magnetic bodies 500 may be mounted on the inner surfaces of the driving magnets 130 so as to be opposite each other.

Therefore, the magnetic bodies 500 reduce a pose difference of the lens moving apparatus and do not require the lens unit 10 to continuously apply power to the coil 120 to maintain a specific position. Further, since the magnetic bodies 500 perform the function of an elastic unit, the lens moving apparatus may be operated without a separate elastic unit and thus, miniaturization of the lens moving apparatus in the optical axis direction and effective utilization of the inner space of the lens moving apparatus may be achieved.

The lens moving apparatus in accordance with this embodiment may be mounted on a camera module, and such a camera module may be provided in various kinds of multimedia apparatuses, such as a cellular phone, a notebook personal computer, a camera phone, a PDA, a smartphone, and a toy, and further in image input apparatuses, such as a CCTV camera and an information terminal of a video tape recorder.

For example, if the lens moving apparatus in accordance with this embodiment may be provided in a camera module, the camera module may further include a printed circuit board (not shown) and an image sensor (not shown).

The image sensor (not shown) may be mounted at the center of the upper surface of the printed circuit board, and various elements (not shown) to drive the camera module may be mounted on the printed circuit board. Further, in order to apply power to drive the lens moving apparatus in accordance with this embodiment, the printed circuit board may be electrically connected to the terminal part 182, the lower elastic member or the upper elastic member, or be electrically connected directly to the coil 120.

The image sensor (not shown) may be mounted at the center of the upper surface of the printed circuit board so as to be located in the optical axis direction together with one or more lenses (not shown) received in the lens unit 10. Such an image sensor converts an optical signal of a target object, incident through the lenses, into an electrical signal.

The above-described adhesive agent may be implemented as thermosetting epoxy or UV epoxy and be cured by heat or exposure to UV light. If thermosetting epoxy is used, the adhesive agent is moved to an oven and is cured by applying heat directly thereto and, if UV epoxy is used, the adhesive agent is cured by applying UV light thereto.

Further, the adhesive agent may be epoxy in which heat curing and UV light curing may be mixed. That is, the adhesive agent may be epoxy in which both heat curing and UV light curing are possible and one of these methods is selected. The adhesive agent is not limited to epoxy and may employ any adhesive material.

As is apparent from the above description, a lens moving apparatus in accordance with one embodiment may readjust the position of a lens in the optical axis direction through feedback of the displacement of the lens in the optical axis direction and thus shorten a focus alignment time of the lens.

Further, the lens moving apparatus in accordance with the embodiment may minimize an interval between a sensing magnet provided on a movable body, i.e., a bobbin, and a position sensor provided on a fixed body, i.e., a housing, more accurately sense the displacement of the lens in the optical axis direction, and thus more accurately and rapidly locate the lens at the focal distance of the lens.

Further, the lens moving apparatus in accordance with the embodiment locates the sensing magnet in the bobbin or on the inner surface of a cover member and locates the position sensor in the housing, and does not require a separate space for mounting of a sensing unit, thus improving space utilization of a camera module (particularly, the bobbin).

Further, the lens moving apparatus in accordance with the embodiment includes the sensing magnet and may thus minimize lowering of performance of the bobbin due to movement, and reduces a limit in disposition of the position sensor and may thus achieve effective focus correction.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus, comprising:
a housing;
a bobbin disposed in the housing;
a coil disposed on the bobbin;
a driving magnet overlapped with the coil in a first direction perpendicular to an optical axis direction;
a sensing magnet coupled to the bobbin; and
a position sensor overlapped with the sensing magnet in a second direction perpendicular to both the optical axis direction and the first direction,
wherein the bobbin comprises a recess on an outer surface of the bobbin,
wherein at least a part of the sensing magnet is disposed in the recess, and
wherein a part of the coil is disposed between the sensing magnet and the position sensor in the second direction.

2. The lens moving apparatus of claim 1, wherein the recess comprises an opening in the optical axis direction, and
wherein the sensing magnet is disposed between the bobbin and the coil in the second direction.

3. The lens moving apparatus of claim 1, wherein the bobbin comprises an additional recess on the outer surface of the bobbin at a position opposite to the recess.

4. The lens moving apparatus of claim 1, wherein the driving magnet comprises a first magnet and a second magnet overlapped with the first magnet in the first direction.

5. The lens moving apparatus of claim 4, wherein the sensing magnet is not overlapped with the first magnet and the second magnet of the driving magnet in the second direction.

6. The lens moving apparatus of claim 1, wherein the position sensor is disposed on another side of the housing than a side on which the driving magnet is disposed.

7. The lens moving apparatus of claim 1, comprising a first printed circuit board, a base and a cover member coupled with the base,
wherein the housing is disposed in the cover member, and
wherein the position sensor is disposed on the first printed circuit board.

8. The lens moving apparatus of claim 7, wherein the first printed circuit board is disposed on the housing.

9. The lens moving apparatus of claim 7,
wherein the first printed circuit board comprises a plurality of terminals configured to be connected to an external power source, and
wherein the plurality of terminals is disposed at one side surface of the base.

10. The lens moving apparatus of claim 3, comprising a weight balance member disposed in the additional recess.

11. The lens moving apparatus of claim 7,
wherein the position sensor is disposed in the cover member.

12. The lens moving apparatus of claim 7, wherein at least a part of the first printed circuit board is disposed between the cover member and the bobbin.

13. The lens moving apparatus of claim 1, comprising an adhesive fixing the sensing magnet to the bobbin,
wherein the sensing magnet is overlapped with the coil in the second direction.

14. The lens moving apparatus of claim 13, wherein the adhesive is disposed in the recess.

15. The lens moving apparatus of claim 1, wherein the coil is wound on the bobbin.

16. A camera apparatus, comprising:
a second printed circuit board;
an image sensor disposed on the second printed circuit board;
the lens moving apparatus of claim 1; and
a lens coupled to the bobbin of the lens moving apparatus.

17. A smartphone comprising the camera apparatus of claim 16.

18. A lens moving apparatus, comprising:
a housing;
a bobbin disposed in the housing and comprising a recess;
a coil disposed on the bobbin;

a driving magnet disposed on the housing and overlapped with the coil in a first direction perpendicular to an optical axis;

a sensing magnet coupled to the bobbin; and a position sensor disposed on a board, wherein at least a part of the sensing magnet is disposed in the recess of the bobbin, wherein the sensing magnet is overlapped with the coil and the position sensor in a second direction perpendicular to both the optical axis and the first direction, and wherein the sensing magnet is not overlapped with the driving magnet in the second direction.

19. A camera apparatus, comprising:

the lens moving apparatus of claim 18;

a lens assembly coupled to the bobbin of the lens moving apparatus; and an image sensor overlapped with the lens assembly in the optical axis, wherein the coil is overlapped with the sensing magnet and the recess in the second direction.

20. The camera apparatus of claim 19, wherein the driving magnet is not overlapped with the coil in the second direction.

* * * * *